United States Patent
Kim et al.

(10) Patent No.: US 11,349,360 B2
(45) Date of Patent: May 31, 2022

(54) MOTOR

(71) Applicant: LG Electronics Inc., Seoul (KR)

(72) Inventors: Jaeho Kim, Seoul (KR); Minsoo La, Seoul (KR); Hyuk Nam, Seoul (KR); Kyungmo Yu, Seoul (KR); Sangyoung Cho, Seoul (KR); Kyungho Ha, Seoul (KR); Pangeun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 239 days.

(21) Appl. No.: 16/696,117

(22) Filed: Nov. 26, 2019

(65) Prior Publication Data
US 2020/0169130 A1  May 28, 2020

(30) Foreign Application Priority Data

Nov. 26, 2018 (KR) .................. 10-2018-0147665
Nov. 26, 2018 (KR) .................. 10-2018-0147666
(Continued)

(51) Int. Cl.
*H02K 1/30* (2006.01)
*H02K 1/27* (2022.01)
(Continued)

(52) U.S. Cl.
CPC ............... *H02K 1/30* (2013.01); *H02K 1/276* (2013.01); *H02K 1/2766* (2013.01);
(Continued)

(58) Field of Classification Search
CPC .......... H02K 1/30; H02K 1/276; H02K 21/16; H02K 1/2766; H02K 1/2786; H02K 21/22;
(Continued)

(56) References Cited

U.S. PATENT DOCUMENTS 4,012,651 A  3/1977  Burson
4,339,874 A  7/1982  Mc'Carty et al.
(Continued)

FOREIGN PATENT DOCUMENTS

CN  1845427  10/2006
CN  101675188  3/2010
(Continued)

OTHER PUBLICATIONS

EP Office Action in Appln. No. 19210107.9, dated Feb. 19, 2021, 7 pages.
(Continued)

*Primary Examiner* — Thomas Truong
(74) *Attorney, Agent, or Firm* — Fish & Richardson P.C.

(57) ABSTRACT

A motor includes a stator and a rotor rotatably disposed at an inner side of the stator or an outer side of the stator. The rotor includes a rotor core block including a plurality of rotor core segments that are arranged along a circumferential direction of the rotor, where each of the rotor core segments includes a plurality of electrical steel sheets that are stacked on one another. The rotor further includes a plurality of permanent magnets disposed between the plurality of rotor core segments, where the plurality of rotor core segments and the plurality of permanent magnets are alternately arranged along the circumferential direction of the rotor. The plurality of electrical steel sheets include bridges that connect the plurality of rotor core segments to one another along the circumferential direction of the rotor.

19 Claims, 13 Drawing Sheets

(30) Foreign Application Priority Data

Nov. 26, 2018 (KR) .................. 10-2018-0147667
Nov. 26, 2018 (KR) .................. 10-2018-0147669

(51) Int. Cl.
| | | |
|---|---|---|
| *H02K 1/2786* | (2022.01) | |
| *H02K 1/276* | (2022.01) | |
| H02K 21/22 | (2006.01) | |
| H02K 21/16 | (2006.01) | |

(52) U.S. Cl.
CPC .......... *H02K 1/2786* (2013.01); *H02K 21/16* (2013.01); *H02K 21/22* (2013.01)

(58) Field of Classification Search
CPC .... H02K 15/03; H02K 15/12; H02K 2213/03; H02K 1/28; H02K 1/27
See application file for complete search history.

(56) References Cited

U.S. PATENT DOCUMENTS

| | | | |
|---|---|---|---|
| 5,786,650 | A | 7/1998 | Uchida et al. |
| 6,384,504 | B1 | 5/2002 | Ehrhart et al. |
| 9,590,459 | B2 | 3/2017 | Hoemann |
| 2003/0193254 | A1 | 10/2003 | Morimatsu |
| 2006/0091754 | A1 | 5/2006 | Kim et al. |
| 2010/0050702 | A1 | 3/2010 | Kim et al. |
| 2011/0175479 | A1 | 7/2011 | Marchitto |
| 2011/0187210 | A1 | 8/2011 | Marchitto |
| 2012/0043844 | A1 | 2/2012 | Bailey et al. |
| 2012/0286520 | A1 | 11/2012 | Booth |
| 2013/0061641 | A1 | 3/2013 | Yoon et al. |
| 2013/0119808 | A1 | 5/2013 | Hirokawa et al. |
| 2014/0070653 | A1 | 3/2014 | Lee et al. |
| 2014/0097718 | A1 | 4/2014 | Yukinori et al. |
| 2014/0102151 | A1 | 4/2014 | Yoon |
| 2014/0152135 | A1 | 6/2014 | Jang et al. |
| 2014/0375162 | A1 | 12/2014 | Kim et al. |
| 2015/0076933 | A1 | 3/2015 | Hoemann et al. |
| 2015/0380998 | A1 | 12/2015 | Hoemann |
| 2016/0156233 | A1 | 6/2016 | Yoon et al. |
| 2017/0070107 | A1 | 3/2017 | Lee et al. |
| 2017/0170694 | A1 | 6/2017 | Bhargava et al. |
| 2018/0069443 | A1* | 3/2018 | Han .................. H02K 1/27 |
| 2019/0207446 | A1 | 7/2019 | Swales et al. |

FOREIGN PATENT DOCUMENTS

| | | |
|---|---|---|
| CN | 102035281 | 4/2011 |
| CN | 102163900 | 8/2011 |
| CN | 102738924 | 10/2012 |
| CN | 103053096 | 4/2013 |
| CN | 104285363 | 1/2015 |
| CN | 104393730 | 3/2015 |
| CN | 105474514 | 4/2016 |
| CN | 107733111 | 2/2018 |
| CN | 107735924 | 2/2018 |
| DE | 909472 | 4/1954 |
| EP | 0669699 | 8/1995 |
| EP | 1237252 | 9/2002 |
| EP | 2824800 | 1/2015 |
| EP | 2942858 | 11/2015 |
| EP | 3349332 | 7/2018 |
| JP | H07264793 | 10/1995 |
| JP | 2001095185 | 4/2001 |
| JP | 2003510998 | 3/2003 |
| JP | 2005261177 | 9/2005 |
| JP | 2012217269 | 11/2012 |
| JP | 2015080336 | 4/2015 |
| KR | 20120110275 | 10/2012 |
| KR | 20130090165 | 8/2013 |
| KR | 20160112412 | 9/2016 |
| KR | 20170030022 | 3/2017 |
| KR | 20180020030 | 2/2018 |
| KR | 20180020030 A * | 2/2018 |
| WO | WO2015009031 | 1/2015 |

OTHER PUBLICATIONS

Extended European Search Report in European Application No. 19210107.9, dated Apr. 15, 2020, 8 pages.
Extended European Search Report in European Application No. 19210106.1, dated Apr. 14, 2020, 9 pages.
Extended European Search Report in European Application No. 19210105.3, dated Apr. 7, 2020, 16 pages.
Extended European Search Report in European Application No. 19210101.2, dated Apr. 2, 2020, 13 pages.
Fofanov et al., "Magnetic properties stainless steel," Stahl, dated Jan. 1, 2013, 24 pages, XP055561965 (with English translation).
US Non-Final Office Action in U.S. Appl. No. 16/696,393, dated Jul. 9, 2021, 47 pages.
US Non-Final Office Action in U.S. Appl. No. 16/696,505, dated Jul. 16, 2021, 36 pages.
Office Action in Chinese Appln. No. 201911174705.4, dated Sep. 30, 2021, 16 pages (with English translation).
Office Action in Chinese Appln. No. 201911175262.0, dated Sep. 23, 2021, 15 pages (with English translation).
Office Action in Chinese Appln. No. 201911176293.8, dated Sep. 23, 2021, 17 pages (with English translation).
Office Action in United States U.S. Appl. No. 16/696,117, dated Nov. 26, 2021, 27 pages.
Office Action in United States U.S. Appl. No. 16/696,311, dated Nov. 26, 2021, 30 pages.
Office Action in Chinese Appln. No. 201911175236.8, dated Sep. 23, 2021, 23 pages (with English translation).

* cited by examiner

MOTOR

CROSS-REFERENCE TO RELATED APPLICATIONS

Pursuant to 85 U.S.C. § 119(a), this application claims the benefit of the earlier filing date and the right of priority to Korean Applications No. 10-2018-0147665, filed on Nov. 26, 2018, No. 10-2018-0147666, filed on Nov. 26, 2018, No. 10-2018-0147667, filed on Nov. 26, 2018, and No. 10-2018-0147669, filed on Nov. 26, 2018, the contents of which are incorporated by reference herein in their entirety.

TECHNICAL FIELD

The present disclosure relates to a motor.

BACKGROUND

A motor is a device that can provide a rotational force generated by electromagnetic interaction between a stator and a rotor to a rotation shaft. A coil may be wound on the stator to generate a rotational force, and the rotor may rotate when a current is applied to the coil. The motor may be used in various fields such as a washing machine, a refrigerator, a compressor, and a cleaner. For example, the motor may be connected to a drum of the washing machine by a rotation shaft to implement the rotation of the drum.

In some examples, permanent magnet type motors may be classified into surface mounted magnet types and interior permanent magnet types according to the attachment type of a permanent magnet. The surface mounted magnet type denotes a form in which a permanent magnet is attached to a surface of a rotor core. The interior permanent magnet type denotes a form in which a permanent magnet embedded in the rotor core. The interior permanent magnet types may include a spoke type in which the rotor core and the permanent magnet stand along a height direction parallel to an axial direction of the rotation shaft.

A spoke type motor may have an advantage in improving the efficiency and performance of the rotor through a magnetic flux concentration effect using the rotor core. In some cases, when a rotational speed of the rotation shaft generated by the spoke type motor is excessively fast, there is a concern that the structural strength of the rotor is lowered. For example, during a spin-drying operation, the rotation shaft of the motor installed in a washing machine may rotate at a higher speed than the other operations, and the rotation speed may exceed 1,200 rpm.

In some cases, when the rotation shaft of the motor excessively rotates, a strong centrifugal force may act on the rotor of the motor. Furthermore, this strong centrifugal force may cause breakage in which the permanent magnet or rotor core in the rotor is separated in a radial direction of the rotor. In some examples, to mitigate such breakage, a motor may include a first fastening member disposed above and below a permanent magnet, and a second fastening member disposed to pass through the rotor core.

In some examples, when the rotation shaft of the motor rotates at a slow speed, the structure may prevent the permanent magnet and the rotor core from being disengaged using the two fastening members and the rotor housing. In some cases, the first fastening member, the second fastening member, and the rotor housing may be formed with individual parts, and thus when the rotation shaft of the motor rotates at a very high speed, the possibility of breakage occurrence may be very high due to an insufficient physical coupling force between each part.

In some cases, the first fastening members are disposed above and below the permanent magnet and the rotor core, respectively, which may increase the motor size.

In some cases, the rotor housing, the rotor core, the permanent magnet, the first fastening member, and the second fastening member may be sequentially assembled in a predetermined order. In this respect, the productivity may be very low, particularly as the number of the fastening members increases, which is disadvantageous to mass production.

In some cases, it may be difficult to improve the structural strength without a size increase or performance deterioration of the rotor rotating at a high speed by using structures such as the fastening members or the like.

In some examples, a plurality of rotor cores may be spaced from each other to increase the efficiency of the motor.

SUMMARY

In some examples, the structure in which the plurality of rotor core segments are spaced apart from each other may be weak to secure a structural strength of a motor, while the efficiency of the motor may be maximized. It is because a strong centrifugal force generated in a rotor during the high-speed operation of the motor may be applied in a direction to scatter the plurality of rotor core segments spaced apart from each other in a radial direction. Accordingly, the present disclosure describes a structure capable of improving the structural strength of a motor at some expense of the efficiency of the motor through a partially separated structure of the rotor core segments.

In some cases, where a connection strength between the fastening members is insufficient, a strong centrifugal force acting on a rotor during a high-speed operation of a motor may cause a breakage of the rotor. In particular, considering that the need for a motor operating at a high speed in various devices such as a washing machine, a cleaner, or the like is continuously increasing, it is not sufficient to secure the structural strength only during a low-speed operation. Accordingly, the present disclosure provides a motor having a structure capable of preventing a permanent magnet and a rotor core segment from being damaged in a radial direction due to a strong centrifugal force acting on a rotor even during a high-speed operation of the motor. In addition, the present disclosure also presents a structure capable of prevent a breakage of a motor caused due to an insufficient physical coupling force between the individual parts.

The present disclosure describes a structure capable of improving the structural strength of a motor through a staggered or alternating assembly structure between parts to improve the structural strength of a rotor through the introduction of fastening members.

The present disclosure also describes a configuration in which parts constituting a rotor are stably mounted in place during the process of producing the rotor to securely maintain a coupling state.

The present disclosure also describes a structure capable of improving the productivity of a motor by reducing the number of parts required for the assembly process while improving the structural strength of the motor. Moreover, the present disclosure further describes a structure that is advantageous in securing dimensional stability subsequent to the assembly process of a motor.

According to one aspect of the subject matter described in this application, a motor includes a stator and a rotor rotatably disposed at an inner side of the stator or an outer side of the stator. The rotor includes a rotor core block including a plurality of rotor core segments that are arranged along a circumferential direction of the rotor, where each of the rotor core segments includes a plurality of electrical steel sheets that are stacked on one another. The rotor further includes a plurality of permanent magnets disposed between the plurality of rotor core segments, where the plurality of rotor core segments and the plurality of permanent magnets are alternately arranged along the circumferential direction of the rotor. The plurality of electrical steel sheets include bridges that connect the plurality of rotor core segments to one another along the circumferential direction of the rotor.

Implementations according to this aspect may include one or more of the following features. For example, the plurality of electrical steel sheets may include: first type electrical steel sheets that are stacked along an axial direction of the rotor, that are in contact with one another in the axial direction of the rotor, and that are spaced apart from one another in the circumferential direction of the rotor, each of the first type electrical steel sheets having a first shape; and second type electrical steel sheets that are connected to the bridges and that are disposed at least one of above the first type electrical steel sheets or below the first type electrical steel sheets, each of the second type electrical steel sheets having a second shape different from the first shape. The first type electrical steel sheets may be stacked between the second type electrical steel sheets in the axial direction of the rotor, and each of the plurality of rotor core segments may include the first type electrical steel sheets and at least one of the second type electrical steel sheets that is disposed at a lower end of the first type electrical steel sheets or an upper end of the first type electrical steel sheets.

In some implementations, the bridges may be disposed at least one of an inner end of the second type electrical steel sheets or an outer end of the second type electrical steel sheets, the inner end being radially inward of the outer end. In some implementations, the bridges may be disposed at an inner end and an outer end of the second type electrical steel sheets, where the inner end is radially inward of the outer end, and the bridges and the first type electrical steel sheets may be alternately arranged along the circumferential direction of the rotor.

In some implementations, one or more of the second type electrical steel sheets may be disposed at each of the upper end and the lower end of the first type electrical steel sheets with respect to the axial direction of the rotor. In some implementations, each of the first type electrical steel sheets and each of the second type electrical steel sheets may include: a body that faces an working surface of the plurality of permanent magnets in the circumferential direction of the rotor; a head that protrudes from an inner end of the body to both sides along the circumferential direction of the rotor; and core protrusions that protrude radially outward from an outer end of the body and that are spaced apart from each other in the circumferential direction of the rotor to thereby define a rotor core slot between the core protrusions. Each of the bridges may connect the heads of two adjacent second type electrical steel sheets to each other or connects the core protrusions of the two adjacent second type electrical steel sheets to each other, where one of the plurality of permanent magnets is interposed between the two adjacent second type electrical steel sheets.

In some implementations, the bridges and two adjacent rotor core segments of the plurality of rotor core segments may define an opening that exposes one of the plurality of permanent magnets in a radial direction of the rotor.

In some implementations, the motor may further include a rotation shaft that passes through the stator and that is connected to the rotor. Each of the plurality of rotor core segments may have a height in an axial direction of the rotations shaft, and a ratio of a sum of thicknesses of one or more of the bridges in the axial direction of the rotation shaft with respect to the height is 5% to 15%.

In some implementations, a width of each of the bridges in a radial direction of the rotor is 0.45 mm to 2 mm.

In some implementations, the motor may further include a rotation shaft that passes through the stator and that is connected to the rotor, and a thickness of each of the bridges in an axial direction of the rotation shaft is 2 mm to 5 mm.

In some implementations, each of the plurality of rotor core segments may have a first end and a second end positioned opposite to each other in an axial direction of the rotation shaft, and each of the plurality of permanent magnets may have a first end and a second end positioned opposite to each other in the axial direction of the rotation shaft. The rotor further may include: a first end cover that covers the first ends of the plurality of permanent magnets and the first ends of the plurality of rotor core segments in the axial direction of the rotation shaft; a second end cover that is spaced apart from the first end cover in the axial direction of the rotation shaft and that covers the second ends of the plurality of permanent magnets and the second ends of the plurality of rotor core segments in the axial direction of the rotation shaft; and a rotor frame connected to the rotation shaft and configured to support the first end cover or the second end cover in the axial direction of the rotation shaft.

In some implementations, each of the first end cover and the second end cover may have an annular shape along the circumferential direction of the rotor. In some examples, the first end cover may include a plurality of first plates that are arranged along the circumferential direction of the rotor, where each of the plurality of first plates has an annular sector shape or a circular arc shape. The second end cover may include a plurality of second plates that are arranged along the circumferential direction of the rotor, where each of the plurality of second plates has an annular sector shape or a circular arc shape.

In some implementations, the plurality of first plates and the plurality of second plates may be arranged to be offset from each other in the circumferential direction of the rotor. In some implementations, the plurality of first plates may face each other at first split points that are arranged along the circumferential direction of the rotor, and the plurality of second plates may face each other at second split points that are arranged along the circumferential direction of the rotor. The first split points and the second split points are alternately arranged in the circumferential direction of the rotor.

In some implementations, each of the plurality of rotor core segments may define a rotor core hole or a rotor core slot that extends parallel to the axial direction of the rotation shaft, and each of the plurality of first plates and each of the plurality of second plates may include a rotor core coupling protrusion configured to be inserted into the rotor core hole or the rotor core slot.

In some implementations, one of the first end cover or the second end cover may include a rotor frame coupling protrusion that protrudes toward the rotor frame, and the rotor further may include a bushing connected to the rotation shaft. The rotor frame may include: a bushing coupling portion configured to receive the bushing; a plurality of spokes that extend along a radial direction and that are disposed around the bushing coupling portion; and a base that is disposed at an outer circumference of the plurality of spokes, that extends along the circumferential direction of the rotor, and that is configured to support the first end cover or the second end cover, where the base defines a cover coupling hole configured to receive the rotor frame coupling protrusion.

In some implementations, each of the plurality of rotor core segments may define a rotor core hole that extends parallel to the axial direction of the rotation shaft, where each of the first end cover, the second end cover, and the base defines a rivet coupling hole at a position facing the rotor core hole in the axial direction of the rotation shaft. The rotor further may include a rivet that passes through the rotor core hole, the rivet coupling hole of the first end cover, the rivet coupling hole of the second end cover, and the rivet coupling hole of the base.

In some implementations, the cover coupling hole and the rivet coupling hole may be alternately arranged at the base along the circumferential direction of the rotor. In some implementations, the bushing coupling portion may include a thread that protrudes toward the rotation shaft and that extends in the axial direction of the rotation shaft.

BRIEF DESCRIPTION OF THE DRAWING

The accompanying drawings, which are included to provide a further understanding of the disclosure and are incorporated in and constitute a part of this specification, illustrate implementations of the disclosure and together with the description serve to explain the principles of the disclosure.

DETAILED DESCRIPTION

Figure 1:
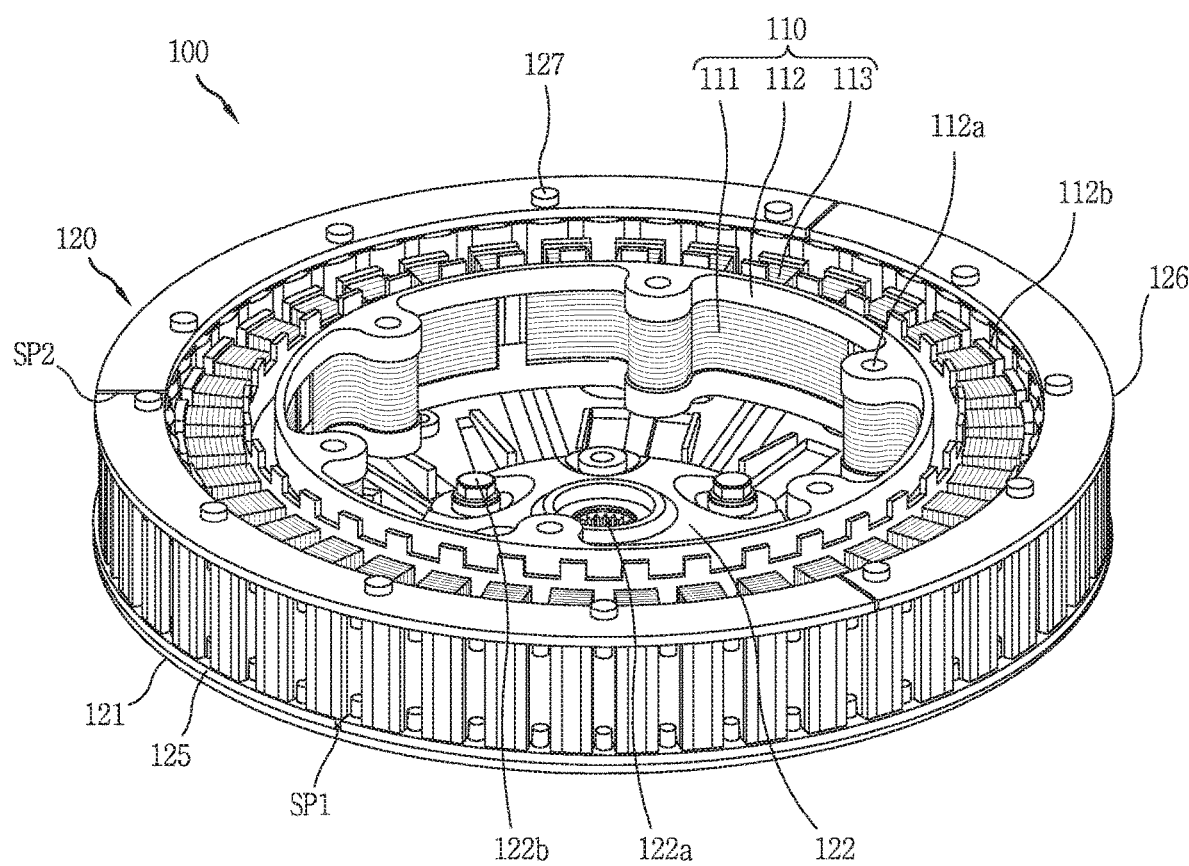
FIG. 1 is a perspective view showing an example motor.

Hereinafter, a motor will be described in more detail with reference to the accompanying drawings.

The same or similar reference numerals may be designated to the same or similar configurations, and the description thereof will be substituted by the earlier description.

FIG. 1 is a perspective view showing an example of a motor 100. The motor 100 may include a stator 110 and a rotor 120. The stator 110 may include a stator core 111, an insulator 112, and a coil 113.

In some implementations, the stator core 111 may be formed by stacking a plurality of electrical steel sheets (magnetic bodies) along an axial direction of a rotation shaft coupled to the motor 100. The stator core 111 may surround the rotation shaft at a position spaced apart from the rotation shaft.

In some implementations, the insulator 112 may be coupled to the stator core 111 at one side and the other side (e.g., upper and lower sides) along a direction parallel to an axial direction of the rotation shaft (in a vertical direction in FIG. 1). The insulator 112 may be made of an electrically insulating material. The insulator 112 may have a stator fixing portion 112a and a teeth insulation portion 112b.

The stator fixing portion 112a may protrude from a circumference of the insulator 112 toward the rotation shaft. The plurality of stator fixing portions 112a are formed. The plurality of stator fixing portions 112a may be disposed at positions spaced apart from each other along the circumference of the insulator 112. The stator fixing portion 112a may define a fastening member fixing hole to be open toward a direction parallel to an axial direction of the rotation shaft. The position of the stator 110 is fixed as the fastening member is coupled to the fastening member fixing hole.

The teeth insulation portion 112b may protrude radially from the circumference of the insulator 112. The teeth insulation portion 112b insulates the coil 113 from teeth connected to a yoke by surrounding the teeth surrounded by the coil 113.

The coil 113 is wound on each teeth insulation portion 112b. Concentrated winding is shown in FIG. 1. A current is applied to the coil 113. The motor 100 is operated by the current applied to the coil 113.

The rotor 120 is rotatably disposed on an inner or outer side of the stator 110. The inner and outer sides are determined whether it faces toward the rotation shaft disposed at the center in a radial direction of the rotor 120 or faces toward an opposite direction thereof. The direction toward the rotation shaft is an inner side, and the direction away from the rotation shaft is an outer side. In FIG. 1, the rotor 120 shows an outer rotor 120 disposed on an outer side of the stator 110.

In some implementations, a spoke 121b type motor 100 may include the outer rotor 120 as described in FIG. 1, but the present disclosure is not limited to the spoke 121b type motor 100 having the outer rotor 120. For instance, the present disclosure may be applicable to an interior permanent magnet type motor having an inner rotor 120.

Figure 2:
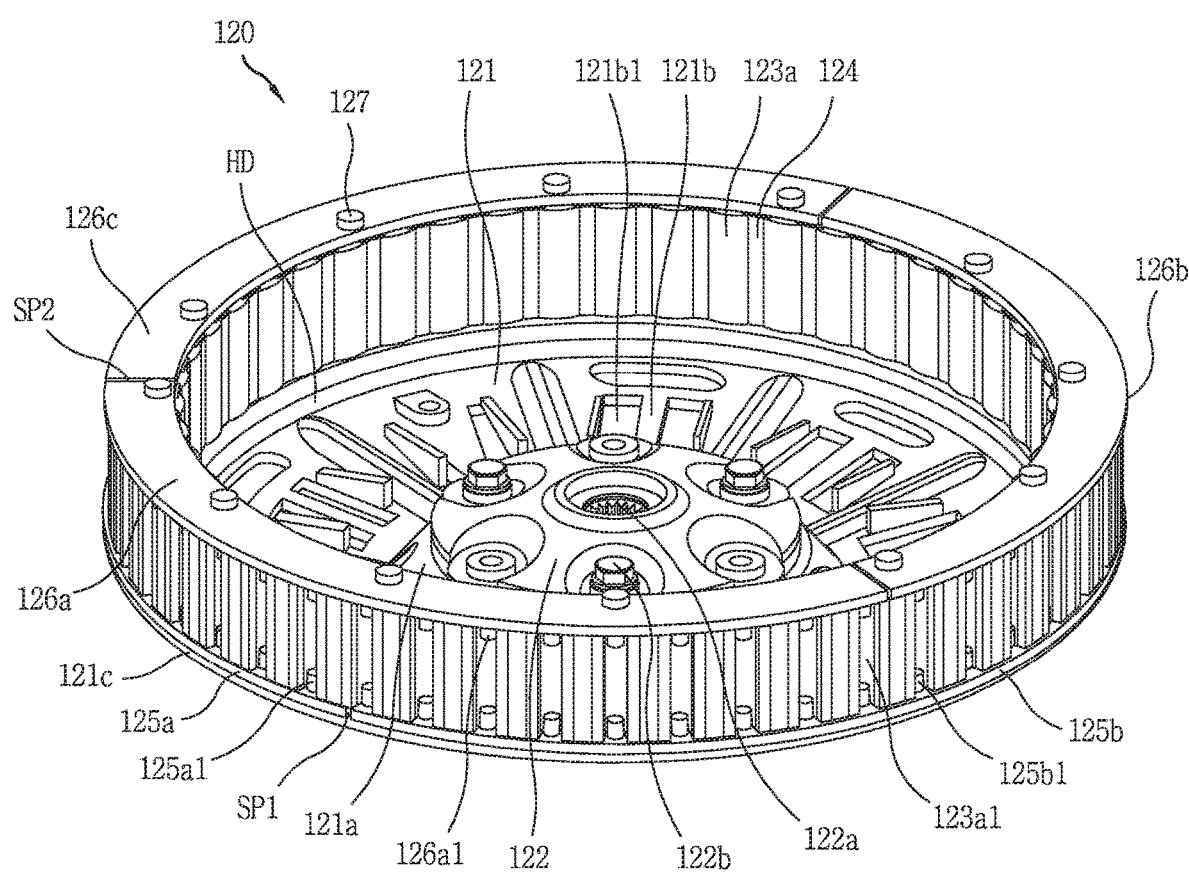
FIG. 2 is a perspective view of an example rotor illustrated in FIG. 1.

Elements with reference numerals that are not described in FIG. 1 will be described with reference to FIG. 2 illustrating only the rotor 120 excluding the stator 110.

FIG. 2 is a perspective view of a rotor illustrated in FIG. 1.

The rotor 120 may include a rotor frame 121, a bushing 122, a plurality of rotor cores (or rotor core segments) 123a, a plurality of permanent magnets 124, a first end cover 125, a second end cover 126, and a plurality of rivets 127.

The rotor frame 121 may also be referred to as a rotor housing. The rotor frame 121 includes a bushing coupling portion 121a, a spoke 121b, and a circumferential wall or a peripheral wall or base 121c.

The bushing coupling portion 121a is formed at the center of the rotor frame 121 in a radial direction of the rotor 120.

The center of the rotor frame 121 corresponds to a position facing the region surrounded by the stator 110.

The bushing coupling portion 121a is formed to engage with the bushing 122. The bushing 122 refers to a part connected to the rotation shaft. One end of the rotation shaft may be coupled to the bushing coupling portion 121a, and the other end may be directly connected to an object to be supplied with a rotational force of the motor 100, such as a drum of the washing machine.

The bushing 122 may have a shape similar to a hollow cylinder. The bushing 122 has threads or bushing coupling portion 122a on an inner circumferential surface of the hollow so as to engage with the rotation shaft. The rotation shaft is inserted directly into the bushing 122. The rotation shaft and the rotor frame 121 are coupled to each other through the bushing 122. In some examples, the threads may protrude toward the rotation shaft and extend in the axial direction of the rotation shaft.

The bushing 122 may be coupled to the bushing coupling portion 121a by a fastening member 122b such as a bolt. A plurality of fastening members 122b may be provided. The plurality of fastening members 122b may be provided at positions spaced apart from each other along a circumference of a hollow formed in the bushing 122.

The spokes 121b is extended in a radial direction from the bushing coupling portion 121a or extended toward a direction inclined at an acute angle with respect to the radial direction. A plurality of spokes 121b are provided therein, and may be arranged around the bushing coupling portion 121a so as to face different directions. The spokes 121b are formed at positions covering one side or the other side of the stator 110 in a direction parallel to an axial direction of the rotation shaft. With respect to a direction illustrated above in FIG. 1, a lower side of the stator 110 corresponds to the one side, and an upper side of the stator 110 corresponds to the other side. In this case, the spoke 121b is formed at a position covering a lower side of the stator 110 from below.

When a plurality of spokes 121b are formed in a radial direction around the bushing coupling portion 122a, a heat dissipation hole 121b1 is formed between the plurality of spokes 121b. Heat generated from the motor due to the operation of the motor may be discharged through the heat dissipation hole 121b1.

The base 121c is formed to support the first end cover 125 or the second end cover 126, which will be described later, in a direction parallel to an axial direction of the rotation shaft. A circumference of the base 121c may be the same as that of the first end cover 125 or that of the second end cover 126.

The base 121c is formed along an outer circumference of the spoke 121b in a circumferential direction. The base 121c may be understood as a ring formed on an outer edge of the spokes 121b. Furthermore, an inner end of the base 121c may be understood as being connected to an outer end of the plurality of spokes 121b along a circumferential direction.

A step (HD) may be formed between the base 121c and the spokes 121b. The plurality of rotor core segments 123a and the stator 110 may be arranged to face each other in a radial direction of the rotor 120 by the step (HD). Furthermore, the plurality of permanent magnets 124 and the stator 110 may be arranged to face each other in a radial direction of the rotor 120 by the step (HD).

The base 121c is formed to support the first end cover 125 or the second end cover 126, which will be described later. The base 121c and the first end cover 125 may be formed in annular shapes corresponding to each other. The base 121c and the second end cover 126 may also be formed in annular shapes corresponding to each other.

Since the rotor frame 121 is formed with a single member, the bushing coupling portion 121a, the spokes 121b and the base 121c should be understood as names indicating different positions of the rotor frame 121, and should not be understood as a combination of different parts.

On the other hand, the plurality of rotor core segments 123a are arranged on an outer side of the stator 110 so as to be spaced apart from each other along a circumferential direction of the rotor 120. The plurality of rotor core segments 123a are formed by stacking a plurality of single electric steel sheets (magnetic bodies) along a direction parallel to an axial direction of the rotation shaft. The single electrical steel sheets may have the same shape. However, at least one electric steel sheet disposed at a lower end and at least one electric steel sheet disposed at an upper end with respect to the stacking direction of the electric steel sheets may be larger than other electric steel sheets to support the permanent magnet 124.

The rotor core segment 123a performs the role of concentrating a force of the permanent magnets 124. When the force of the permanent magnet 124 is concentrated on the rotor core segment 123a, the performance of the motor 100 dramatically increases. However, when the plurality of rotor core segments 123a are connected to each other, the efficiency of the motor 100 is reduced. Therefore, in order to improve the efficiency of the motor 100, the plurality of rotor core segments 123a may be spaced from each other.

The plurality of permanent magnets 124 are alternately arranged one by one with the plurality of rotor core segments 123a along a circumferential direction of the rotor 120. Here, the circumferential direction of the rotor 120 refers to a circumferential direction of the base 121c. The plurality of permanent magnets 124 and the plurality of rotor core segments 123a are alternately arranged one by one, and thus the same number of permanent magnets 124 and the rotor core segments 123a are provided in the rotor 120.

The plurality of rotor core segments 123a and the plurality of permanent magnets 124 are exposed to inner and outer sides of the rotor 120 in a radial direction of the rotor 120. Here, the inner side of the rotor 120 refers to a position at which the bushing 122 is installed. Furthermore, the outer side of the rotor 120 refers to a position corresponding to an opposite side of the bushing 122 in a radial direction with respect to the plurality of rotor core segments 123a or the plurality of permanent magnets 124.

Each of the plurality of rotor core segments 123a and the plurality of permanent magnets 124 has a first end and a second end in a direction parallel to an axial direction of the rotation shaft. Here, the first end refers to a lower end of the plurality of rotor core segments 123a, and a lower end of the plurality of permanent magnets 124, with respect to a direction illustrated in FIG. 2. However, ordinal numbers, first and second, do not have a special meaning in the ordinal number in that they are added to distinguish each other. Therefore, the upper end of the plurality of rotor core segments 123a and the upper end of the plurality of permanent magnets 124 may be also referred to as a first end.

The first end cover 125 is formed to cover a first end of the plurality of permanent magnets 124 and a first end of the plurality of rotor core segments 123a in a direction parallel to an axial direction of the rotation shaft. The first end cover 125 is formed in an annular shape along a circumferential direction of the rotor 120.

The first end of the plurality of rotor core segments 123a and the first end of the plurality of permanent magnets 124 refer to the respective lower ends thereof in FIG. 2. Accordingly, the first end cover 125 is formed to cover a lower end of the plurality of permanent magnets 124 and a lower end of the plurality of rotor core segments 123a in a direction parallel to an axial direction of the rotation shaft.

The first end cover 125 is disposed between the plurality of rotor core segments 123a and the base 121c in a direction parallel to an axial direction of the rotation shaft. Furthermore, since the plurality of rotor core segments 123a and the plurality of permanent magnets 124 are alternately arranged along the same circumference, it may also be understood that the first end cover 125 is disposed between the plurality of permanent magnets 124 and the base 121c in a direction parallel to an axial direction of the rotation shaft.

Similarly, the second end cover 126 is formed to cover a second end of the plurality of permanent magnets 124 and a second end of the plurality of rotor core segments 123a in a direction parallel to an axial direction of the rotation shaft. The second end cover 126 is formed in an annular shape along a circumferential direction of the rotor 120.

The second end of the plurality of rotor core segments 123a and the second end of the plurality of permanent magnets 124 refer to the respective upper ends thereof in FIG. 2. Accordingly, the second end cover 126 is formed to cover an upper end of the plurality of rotor core segments 123a and an upper end of the plurality of permanent magnets 124 in a direction parallel to an axial direction of the rotation shaft.

The second end cover 126 is disposed so as to be spaced apart from the first end cover 125 in a direction parallel to an axial direction of the rotation shaft. The first end cover 125 and the second end cover 126 are disposed at positions facing each other in an axial direction of the rotation shaft. The other components except for the rotor frame 121 may be symmetrical to each other with respect to a plane perpendicular to an axial direction of the rotation shaft. Thus, the rotor frame 121 may be coupled to the second end cover 126.

The first end cover 125 has rotor core coupling protrusions 125a1, 125b1, 126a1 protruded toward the second end cover 126. A plurality of rotor core coupling protrusions 125a1, 125b1 of the first end cover 125 are provided, and the plurality of rotor core coupling protrusions 125a1, 125b1 are formed at positions spaced apart from each other along a circumferential direction of the first end cover 125.

The second end cover 126 also has a rotor core coupling protrusion 126a1 protruded toward the first end cover 125. A plurality of rotor core coupling protrusions 126a1, 126b1 of the second end cover 126 are provided, and the plurality of rotor core coupling protrusions 126a1 are formed at positions spaced apart from each other along a circumferential direction of the second end cover 126.

Each of the plurality of rotor core segments 123a has a rotor core slot 123a5 formed along a direction parallel to an axial direction of the rotation shaft. The rotor core slot 123a5 is formed at an outer end of each rotor core segment 123a. Furthermore, the rotor core coupling protrusions 125a1, 125b1 of the first end cover 125 and the rotor core coupling protrusion 126a1 of the second end cover 126 are inserted into the rotor core slot 123a5 of the rotor core segment 123a along a direction parallel to an axial direction of the rotation shaft.

The first end cover 125 is also formed by annular sector or circular arc shaped plates 125a, 125b. The plates 125a, 125b forming the first end cover 125 are arranged along a circumferential direction of the rotor 120. A first split point (SP1) is formed each between the plates 125a, 125b of the first end cover 125 along a circumferential direction of the rotor 120.

The second end cover 126 is also formed by annular sector or arc shaped plates 126a, 126b, 126c. The plates 126a, 126b, 126c are arranged along a circumferential direction of the rotor 120. A second split point (SP2) is formed each between the plates 126a, 126b, 126c of the second end cover 126 along a circumferential direction of the rotor 120. As illustrated in FIG. 2, when three plates 126a, 126b, 126c are arranged on a circumference of the rotor 120 about the rotation shaft, each plate 126a, 126b, 126c is shown in an annulus sector or circular arc shape having a center angle of 120°. Furthermore, three second split points (SP2) are formed along a circumferential direction of the rotor 120.

If the first end cover 125 and the second end cover 126 are not formed by the plates 125a, 125b, 126a, 126b, 126c but formed as a single member, then an excessive centrifugal force acts on the first end cover 125 and the second end cover 126. The first end cover 125 and the second end cover 126 may include a plurality of plates 125a, 125b, 126a, 126b, 126c, a centrifugal force acting on only a single member may be dispersed on the plurality of plates 125a, 126a, 126b, 126c.

The rivet 127 is formed to engage the first end cover 125, the rotor core block 123, the second end cover 126, and the base 121c of the rotor frame 121. One end of the rivet 127 may be exposed through the second end cover 126. A more detailed coupling structure of the rivet 127 will be described later.

Hereinafter, an assembling structure of the rotor 120 will be described.

Figure 3:
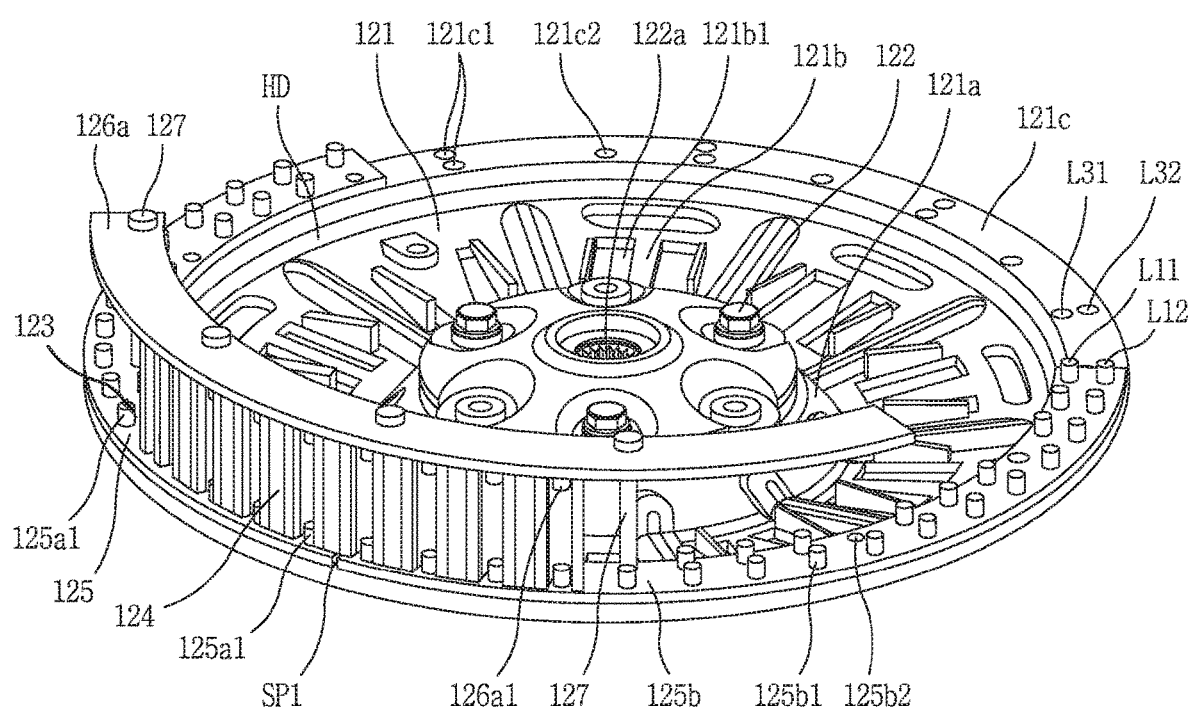
FIG. 3 is a view illustrating examples of a rotor core block, a plurality of permanent magnets, two first end covers, one second end cover, a rotor frame, and four rivets coupled to the one rotor core block in an assembly structure of the rotor illustrated in FIG. 2.

FIG. 3 illustrates one rotor core block 123, a plurality of permanent magnets 124 coupled to the one rotor core block 123, two first end covers 125, one second end cover 126, a rotor frame 121, and four rivets 127 to visually check an assembly structure of the rotor illustrated in FIG. 2.

In some implementations, the rotor 120 may include a plurality of rotor core blocks 123. The rotor core block 123 refers to a single unit member formed by gathering a plurality of rotor core segments 123a. Therefore, one rotor core block 123 is provided with a plurality of rotor core segments 123a. Furthermore, the plurality of rotor core segments 123a are connected to each other by a bridge, which will be described later, to form a rotor core block 123 as a unit member.

In examples, where the number of rotor core segments 123a included in one rotor 120 is 48, there are also 48 permanent magnets 124 arranged alternately with the rotor core segment 123a. In some examples, the rotor 120 may include a plurality of rotor core blocks 123. For example, when the number of rotor core segments 123a included in one rotor core block 123 is eight as shown in FIG. 3, six rotor core blocks 123 may be arranged in total to make the rotor 120 including 48 rotor core segments 123a and 48 permanent magnets 124.

In some implementations, the plurality of rotor core blocks 123 may be arranged to be spaced apart from each other along a circumferential direction of the rotor 120. The plurality of permanent magnets 124 are arranged one by one each between the two rotor core segments 123a along a circumferential direction of the rotor 120. The plurality of rotor core segments 123a and the plurality of permanent magnets 124 are alternately arranged one by one.

On the other hand, the annular sector or arc shaped plates 125a, 125b forming the first end cover 125 and the plates 126a forming the second end cover 126 are arranged to be staggered from each other in a circumferential direction of the rotor. For instance, a first split point (SP1) is formed each between the plates 125a, 125b of the first end cover 125, and a second split point (SP2) is formed each between the plates 126a of the second end cover 126, wherein the first split point (SP1) and the second split point (SP2) are alternately formed in a circumferential direction of the rotor 120. In other words, the plates 125a, 125b are offset from the plates 126a, 126b in the circumferential direction of the rotor 120.

When the plates 125a, 125b forming the first end cover 125 and the plates 126a forming the second end cover 126 are staggered from each other in a circumferential direction of the rotor, the first split point (SP1) and the second split point (SP2) are formed at positions which do not overlap with each other in a direction parallel to an axial direction of the rotation shaft.

When the first end cover 125 and the second end cover 126 are formed by the plurality of plates 125a, 125b, 126a, 126b, a centrifugal force may be dispersed, but the first and second split points (SP1, SP2) may be a cause for decreasing the strength of the coupling structure of the rotor 120. When the first split point (SP1) and the second split point (SP2) are formed at positions that do not overlap with each other in a direction parallel to an axial direction of the rotation shaft, the strength of the coupling structure of the rotor 120 may be suppressed from decreasing.

The rotor core coupling protrusions 125a1, 125b1 of the first end cover 125 may be arranged in two columns (L11, L12) along a radial direction of the rotor 120. In the first column (L11) relatively closer to the rotation shaft is formed with not only the rotor core coupling protrusions 125a1, 125b1 but also the rivet coupling holes 125a2, 125b2. The plurality of rotor core coupling protrusions 125a1, 125b1 and one rivet coupling hole 125a2, 125b2 are alternately formed in the first column (L11) along a circumferential direction of the first end cover 125. Furthermore, only the rotor core coupling protrusions 125a1, 125b1 are formed in the second column (L12) relatively far from the rotation shaft.

In some implementations, the rivet coupling hole 125b2 may be formed only in the second column (L12), and may also be formed in both the first column (L11) and the second column (L12). Furthermore, the rivet coupling hole 125b2 may alternatively be formed in the first column (L11) and the second column (L12) along a circumferential direction of the rotor 120.

The plurality of rotor core coupling protrusions 125a1, 125b1 and the plurality of rivet coupling holes 125b2 are formed along a circumferential direction of the first end cover 125. The shape of the second end cover 126 is also substantially the same as or similar to that of the first end cover 125.

A plurality of cover coupling holes 121c1 and a plurality of rivet coupling holes 121c2 are formed in the base 121c of the rotor frame 121.

The cover coupling holes 121c1 of the rotor frame 121 may be arranged in two columns (L31, L32) along a radial direction of the rotor frame 121. The two columns (L31, L32) denote a first column (L31) relatively closer to the rotation shaft and a second column L32 relatively far from the rotation shaft. The cover coupling holes 121c1 of the first column (L31) and the second column (L32) are formed on the same line in a radial direction of the rotor frame 121.

The rivet coupling holes 121c2 of the rotor frame 121 are formed on the same circumference as the first column (L41) of the cover coupling holes 121c1. The rivet coupling holes 121c2 may be alternately formed with the cover coupling holes 121c1 along a circumferential direction of the base 121c.

The plurality of cover coupling holes 121c1 and the plurality of rivet coupling holes 121c2 formed in the first column (L31) are formed and alternately arranged at positions spaced apart from each other along a circumferential direction of the base 121c. The rivet coupling holes 121c2 may also be formed in the second column (L32).

The rivets 127 are extended along a direction parallel to an axial direction of the rotation shaft. The rivet 127 passes through the first end cover 125, the rotor core segment 123a, the second end cover 126, and the base 121c of the rotor frame 121 to couple parts constituting the rotor 120 to each other.

Next, each part constituting the rotor 120 will be described.

Figure 4:
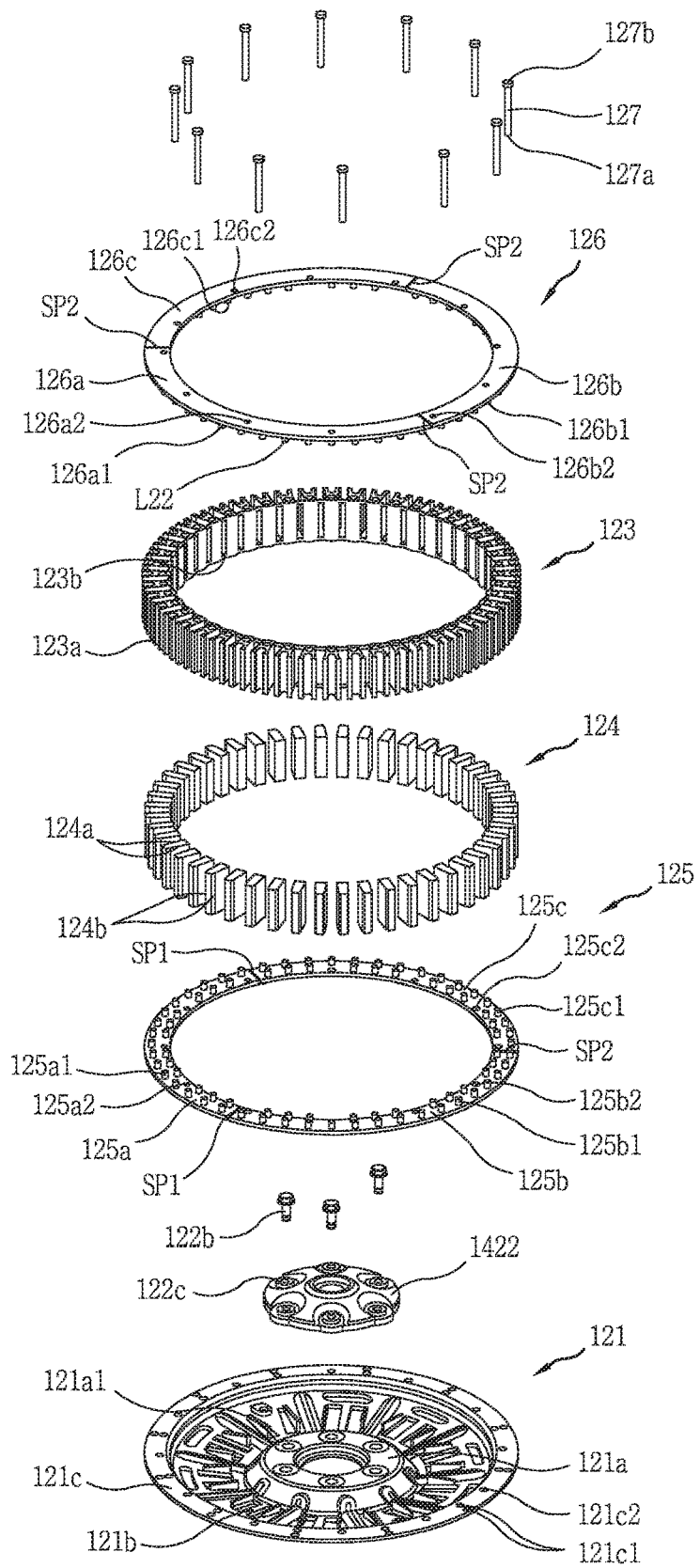
FIG. 4 is an exploded perspective view of the rotor.

FIG. 4 is an exploded perspective view of the rotor 120.

Figure 5:
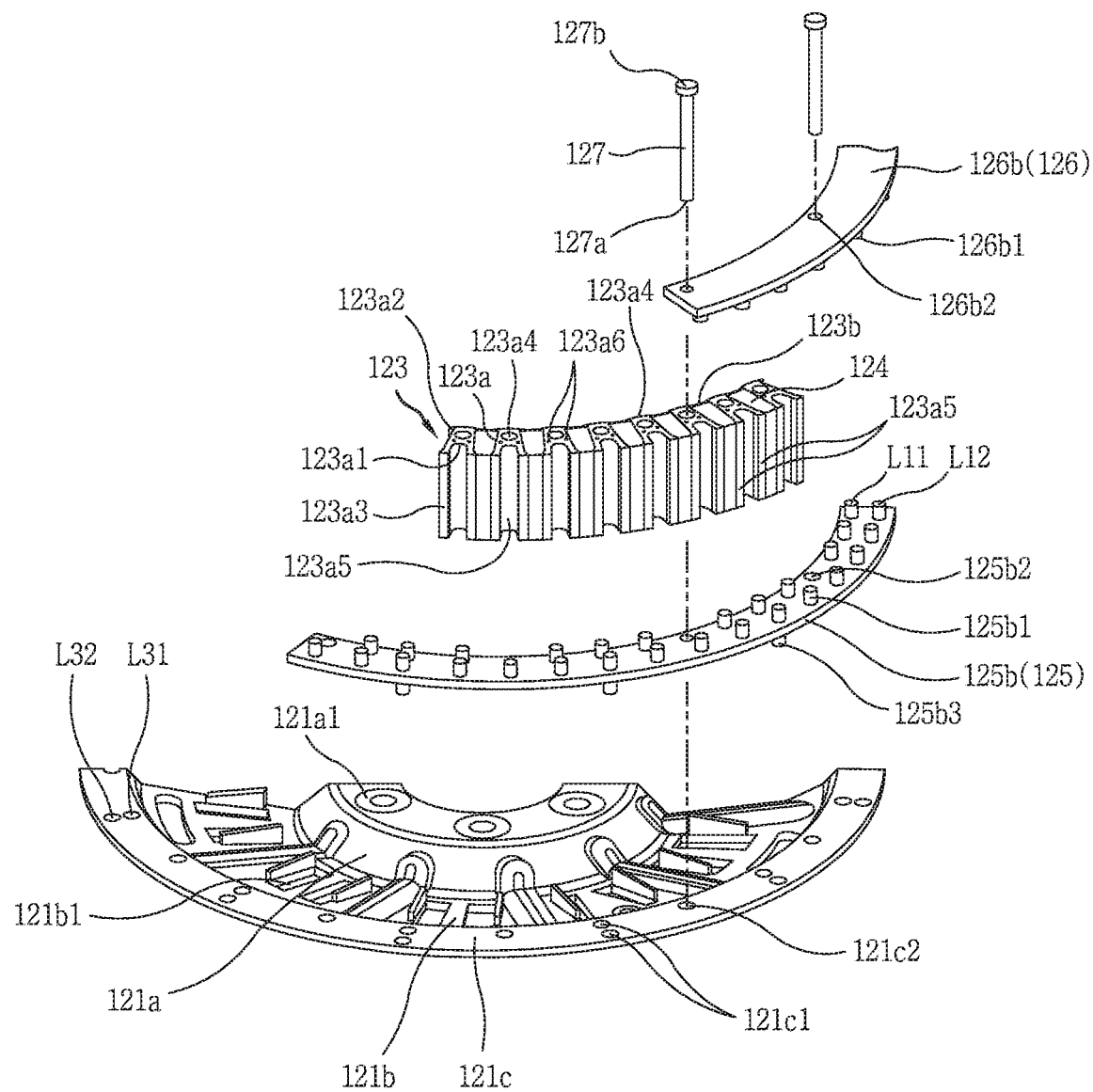
FIG. 5 is a partially enlarged view illustrating the exploded perspective view of the rotor.

FIG. 5 is a partially enlarged view illustrating the exploded perspective view of the rotor 120.

The bushing 122 is seated in the bushing coupling portion 121a of the rotor frame 121 in an axial direction of the rotation shaft. A plurality of fastening member coupling holes 122c are formed at positions spaced apart from each other around a hollow formed in the bushing 122. Furthermore, a plurality of fastening member coupling holes 121a1 are also formed at positions spaced from each other around a hollow formed in the bushing coupling portion 121a. The fastening member coupling holes 122c of the bushing 122 and the fastening member coupling holes 121a1 of the bushing coupling portion 121a are formed at positions facing each other in a direction parallel to an axial direction of the rotation shaft.

The fastening member 122b is fastened to the fastening member coupling hole 122c of the bushing 122 and the fastening member coupling hole 121a1 of the bushing coupling portion 121a in a direction parallel to an axial direction of the rotation shaft. The fastening member 122b may be formed of a bolt or the like, and a nut corresponding to the bolt may be provided on an inner or outer side of the rotor frame 121.

In some implantations, each rotor core segment 123a includes a body 123a1, a head 123a2, a core protrusion 123a3, a rotor core hole 123a4, a rotor core slot 123a5, and a mac 123a6.

The body 123a1 corresponds to a portion occupying the largest volume of the rotor core segment 123a. The body 123a1 is disposed to face the permanent magnet 124 in a circumferential direction of the rotor 120. Both side surfaces of the body 123a1 are disposed to face a first working surface 124a of the permanent magnet 124, and are in surface contact with the first working surface 124a.

It will be understood that the plurality of rotor core segments 123a are arranged along a side face of the hollow cylinder. A portion located on a circumference corresponding to an inner diameter of the cylinder corresponds to an inner end of the body 123a1. Furthermore, an outer end of the body 123a1 indicates a portion formed with the core protrusion 123a3 and the rotor core slot 123a5 to be described later. The inner end of the body 123a1 is disposed to face the stator 110 at a position spaced apart from the stator 110.

A width of the body 123a1 with respect to a circumferential direction of the rotor 120 may be formed to gradually increase from the inner end to the outer end of the body 123a1. For instance, a linear distance between both side surfaces of the body 123a1 in a circumferential direction of the rotor 120 gradually increases from the inner end to the outer end of the body 123a1.

When an imaginary first circumference corresponding to an inner end of the rotor core segment 123a is compared with an imaginary second circumference corresponding to an outer end of the rotor core segment 123a, the second circumference is larger than the first circumference. When the first working surface 124a of the permanent magnet 124 is extended along a direction parallel to a radial direction of the rotor 120, an area based on a difference between the first circumference and the second circumference may be filled by the rotor core segment 123a. A width of the body 123a1 with respect to a circumferential direction of the rotor 120 to fill the area is formed to gradually increase from the inner end to the outer end. Accordingly, the plurality of rotor core segments 123a and the plurality of permanent magnets 124 in a circumferential direction of the rotor 120 may be arranged without a hollow space. The outer end of the rotor core segment 123a is disposed radially outward of the inner end of the rotor core segment 123a.

The head 123a2 is protruded from an inner end of the body 123a1 to both sides thereof toward a circumferential direction of the rotor 120. A single rotor core segment 123a is formed with two heads 123a2.

Two heads 123a2 are formed at positions facing an inner surface of the permanent magnet 124 with respect to a single permanent magnet 124. The two heads 123a2 restrict the movement of the permanent magnet 124 toward the rotation shaft. Either one of the two heads 123a2 corresponds to a head 123a2 of the rotor core segment 123a disposed on one side of the permanent magnet 124, and the other one corresponds to a head 123a2 of the rotor core segment 123a disposed on the other side of the permanent magnet 124.

The core protrusion 123a3 is protruded from an outer end of the body 123a1. The core protrusion 123a3 is extended in two sections toward directions away from each other to form the rotor core slot 123a5. One rotor core segment 123a is formed with two core protrusions 123a3. The two core protrusions 123a3 are protruded toward a direction inclined to a radial direction of the rotor 120. Both side surfaces of the core protrusion 123a3 are arranged to face the second working surface 124b of the permanent magnet 124, and are in surface contact with the second working surface 124b.

Two core protrusions 123a3 are formed at a position facing an outer surface of one permanent magnet 124 with respect to the permanent magnet 124. The two core protrusions 123a3 restrain the permanent magnet 124 that is about to move toward a direction away from the rotation shaft due to a centrifugal force during the operation of the motor 100. Either one of the two core protrusions 123a3 corresponds to a core protrusion 123a3 of the rotor core segment 123a disposed on one side of the permanent magnet 124, and the other one corresponds to a core protrusion 123a3 of another rotor core segment 123a disposed on the other side of the permanent magnet 124.

The rotor core hole 123a4 is formed in the body 123a1. The rotor core hole 123a4 is open toward a direction parallel to an axial direction of the rotation shaft (in a vertical direction in FIGS. 4 and 5). The rotor core hole 123a4 is formed between inner and outer ends of the body 123a1 in a radial direction of the rotor 120. The rotor core slot 123a5 is formed at an outer end of the body 123a1 and thus the rotor core hole 123a4 is formed between an inner end of the body 123a1 and the rotor core slot 123a5 in a radial direction of the rotor 120.

The rotor core slot 123a5 may be defined between the two core protrusions 123a3 in a circumferential direction of the rotor 120. It will be understood that the rotor core slot 123a5 has a shape recessed toward the body 123a1 between the two core protrusions 123a3 with respect to a radial direction of the rotor 120. A circumference of the rotor core slot 123a5 is formed as a curved surface having a cross section of a semicircle or a shape similar to a semicircle.

The rotor core hole 123a4 and the rotor core slot 123a5 are a region that accommodates the rotor core coupling protrusions 125a1, 125b1, 125c1 of the first end cover 125 and the rotor core coupling protrusions 126a1, 126b1k, 126c1 of the second end cover 126, and the rivet 127. The rotor core coupling protrusions 125a1, 125b1, 125c1 formed in the first column (L11) in the first end cover 125 and the rotor core coupling protrusions 126a1, 126b1, 126c1 formed in the first column (L21) in the second end cover 126 are inserted into the holes. Furthermore, the rotor core coupling protrusions 125a1, 125b1, 125c1 formed in the second column (L12) in the first end cover 125 and the rotor core coupling protrusions 126a1, 126b1, 126c1 formed in the second column (L22) in the second end cover 126 are inserted into the rotor core slots 123a5. The rivets 127 are inserted into some rotor core holes 123a4.

When the rotor 120 is to be manufactured through the assembly of parts constituting the rotor 120, the respective parts may be seated in place. The coupling structure of the rotor core coupling protrusions 125a1, 125b1, 125c1, 126a1, 126b1, 126c1 and the rotor core holes 123a4 and the coupling structure of the rotor core coupling protrusions 125a1, 125b1, 125c1, 126a1, 126b1, 126c1 and the rotor core slots 123a5 perform the role of an assembly guide for seating parts in place.

The mac 123a6 may be defined at each single electrical steel sheet constituting each rotor core segment 123a. The mac 123a6 may protrude from one surface of each electrical steel sheet, and have a protruding shape that is recessed from the other surface at the same position as the protruding position. A plurality of macs 123a6 may be formed around the rotor core holes 123a4.

The mac 123a6 is a structure or a mating part for aligning and stacking single electrical steel sheets at positions corresponding to each other. When a plurality of electric steel sheets are stacked in such a manner that either one protruded mac 123a6 between the two electric steel sheets disposed to face each other is inserted into the other recessed mac 123a6, the electrical steel sheets constituting the rotor core segment 123a may be aligned with each other.

The inner ends of each rotor core segment 123a are protruded to both sides in a circumferential direction. In addition, a circumferential width of each rotor core segment 123a is gradually widened toward the outer end. This type of inner and outer ends prevent the permanent magnet 124 from being radially released from between the two rotor core segments 123a.

The inner ends of the rotor core segment 123a are disposed so as to face the stator 110 while covering the stator 110. The outer ends of the rotor core segment 123a are divided into two sections, and a rotor core slot 123a5 as described above is formed between the two sections. For example, the rotor core slot 123a5 is formed in a recessed shape toward an inner end from an outer end of the rotor core segment 123a.

The plurality of rotor core segments 123a and the plurality of permanent magnets 124 are alternately arranged one by one, and thus, the plurality of rotor core segments 123a are spaced from each other along a circumferential direction of the rotor 120. However, in one rotor core block 123, the plurality of rotor core segments 123a are connected to each other by a bridge 123b.

The bridge 123b is formed to connect the rotor core segments 123a provided in the rotor core block 123 with each other. The bridge 123b may be formed to connect the heads 123a2 of two adjacent rotor core segments 123a to each other or connect the core protrusions 123a3 of the two rotor core segments 123a to each other.

The bridge 123b is formed at an inner or outer end of the rotor core segment 123a to connect the plurality of rotor core segments 123a to each other. The bridge 123b is extended in a circumferential direction along the inner or outer ends of the plurality of rotor core segments 123a. The plurality of rotor core segments 123a spaced from each other due to the alternate arrangement with the permanent magnets 124 are connected to each other by the bridge 123b to form a rotor core block 123 as a unit member.

The number of bridges 123b is one less than or greater than that of rotor core segments 123a provided in one rotor core block 123. For instance, when the number of the rotor core segments 123a provided in one rotor core block 123 is eight, at least seven bridges 123b may be provided in the one rotor core block 123.

Each permanent magnet 124 has a first working surface 124a and a second working surface 124b. The magnetic field lines of the permanent magnet 124 are generated from the first working surface 124a and the second working surface 124b.

The first working surface 124a corresponds to the largest surface of the permanent magnet 124. The first working surface 124a faces a circumferential direction of the rotor 120. The first working surface 124a may be parallel to a radial direction of the rotor 120. The first working surface 124a faces a side surface of the body 123a1 in a circumferential direction of the rotor 120. The first working surface 124a is in surface contact with a side surface of the body 123a1.

The second working surface 124b forms a boundary at an obtuse angle with the first working surface 124a. When the second working surface 124b forms a boundary at an obtuse angle with the first working surface 124a, the second working surface 124b may be inclined to a radial direction of the rotor 120. In some examples, a direction toward the rotation shaft may be referred to as an inner direction of the rotor 120, and a direction away from the rotation shaft may be referred to as an outer direction of the rotor 120. The second working surface 124b is formed in an outer direction of the rotor 120 compared to the first working surface 124a. That is, the second working surface 124b may be disposed radially outward of the first working surface 124a.

In some implementations, the first working surface 124a and the second working surface 124b may define an obtuse angle at an interface or boundary, and an edge may be located at the boundary between the first working surface 124a and the second working surface 124b. The edge may extend parallel to an axial direction of the rotation shaft.

When the first working surface 124a and the second working surface 124b form a boundary at an obtuse angle, a width of the permanent magnet 124 based on a circumferential direction of the rotor 120 gradually decreases from a boundary between the first working surface 124a and the second working surface 124b to an outer end of the permanent magnet 124. An outer end of the permanent magnet 124 being gradually decreased by the second working surface 124b corresponds to two gradually widening core protrusions 123a3 of the rotor core segment 123a.

The first end cover 125 has a first surface and a second surface. The first surface refers to a surface facing the base 121c of the rotor frame 121. Furthermore, the second surface refers to a surface facing the plurality of rotor core segments 123a and the plurality of permanent magnets 124.

On the first surface of the first end cover 125, a rotor frame coupling protrusion 125b3 is formed. The rotor frame coupling protrusion 125b3 is protruded from the first surface of the first end cover 125 toward the base 121c of the rotor frame 121. The rotor frame coupling protrusion 125b3 is formed at a position facing the cover coupling hole 121c1 of the rotor frame 121.

A plurality of rotor frame coupling protrusions 125b3 may be provided, and the plurality of rotor frame coupling protrusions 125b3 may be arranged in two rows (L41, L42, see FIG. 9A) along a circumferential direction of the first end cover 125. The two columns (L41, L42) denote a first column (L41) relatively closer to the rotation shaft and a second column (L42) relatively far from the rotation shaft. The rotor frame coupling protrusion 125b3 of the first column (L41) and the rotor frame coupling protrusion 125b3 of the second column (L42) are formed on the same line in a radial direction of the rotor frame 121.

The first end cover 125 is formed with rivet coupling holes 125a2, 125b2, 125c2. The rivet coupling holes 125a2, 125b2, 125c2 are open toward a direction parallel to an axial direction of the rotation shaft. A plurality of rivet coupling holes 125a2, 125b2, 125c2 are formed on the first end cover 125, and the plurality of rivet coupling holes 125a2, 125b2, 125c2 are spaced apart from each other in a circumferential direction. The rivet coupling holes 125a2, 125b2, 125c2 of the first end cover 125 may be formed in the first column (L11).

The second end cover 126 is also formed with rivet coupling holes 126a2, 126b2, 126c2 at positions corresponding to the rivet coupling holes 125a2, 125b2, 125c2 of the first end cover 125. The rivet coupling holes 125a2, 125b2, 125c2 of the first end cover 125 and the rivet coupling holes 126a2, 126b2, 126c2 of the second end cover 126 correspond to each other in a direction parallel to an axial direction of the rotation shaft. The riveting coupling holes 125a2, 125b2, 125c2 of the second end cover 126 may also be formed in the first column (L21).

The rivet coupling holes 121c2 are also formed on the base 121c of the rotor frame 121 at positions corresponding to the rivet coupling holes 125a2, 125b2, 125c2 of the first end cover 125 and the rivet coupling holes 126a2, 126b2, 126c2 of the second end cover 126. Similar to the above description, the corresponding direction is a direction parallel to an axial direction of the rotation shaft. The rivet coupling holes 121c2 of the rotor frame 121 may also be formed in the first column (L31).

With respect to a direction illustrated in FIGS. 4 and 5, the rivets 127 sequentially pass through the rivet coupling holes 126a2, 126b2, 126c2 of the second end cover 126, the rotor core holes 123a4 of the rotor core segment 123a, the rivet coupling holes 125a2, 125b2, 125c2 of the first end cover 125, and the rivet coupling holes 121c2 of the rotor frame 121. When the first end 127a or the second end 127b of the rivet 127 is machined to be larger than the holes after the rivet 127 sequentially passes through the holes, parts constituting the rotor 120 are coupled to each other.

Various implementations of the rotor core block 123 will be described below.

Figure 6A:
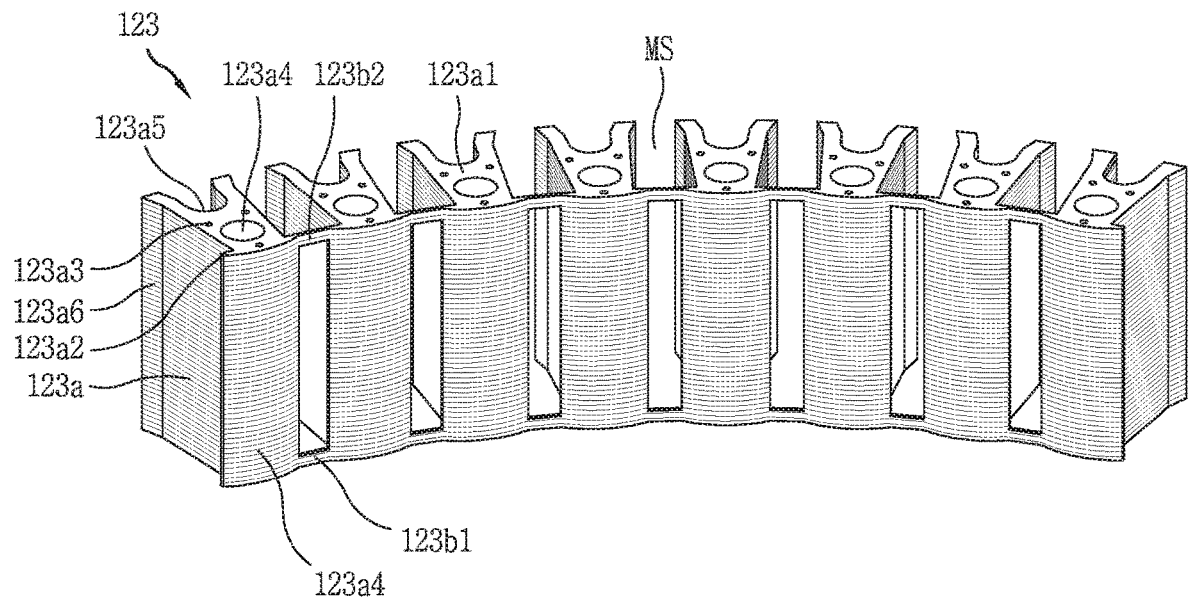
FIG. 6A is a perspective view showing an example rotor core block.

FIG. 6A is a perspective view showing an example rotor core block 123.

Figure 6B:
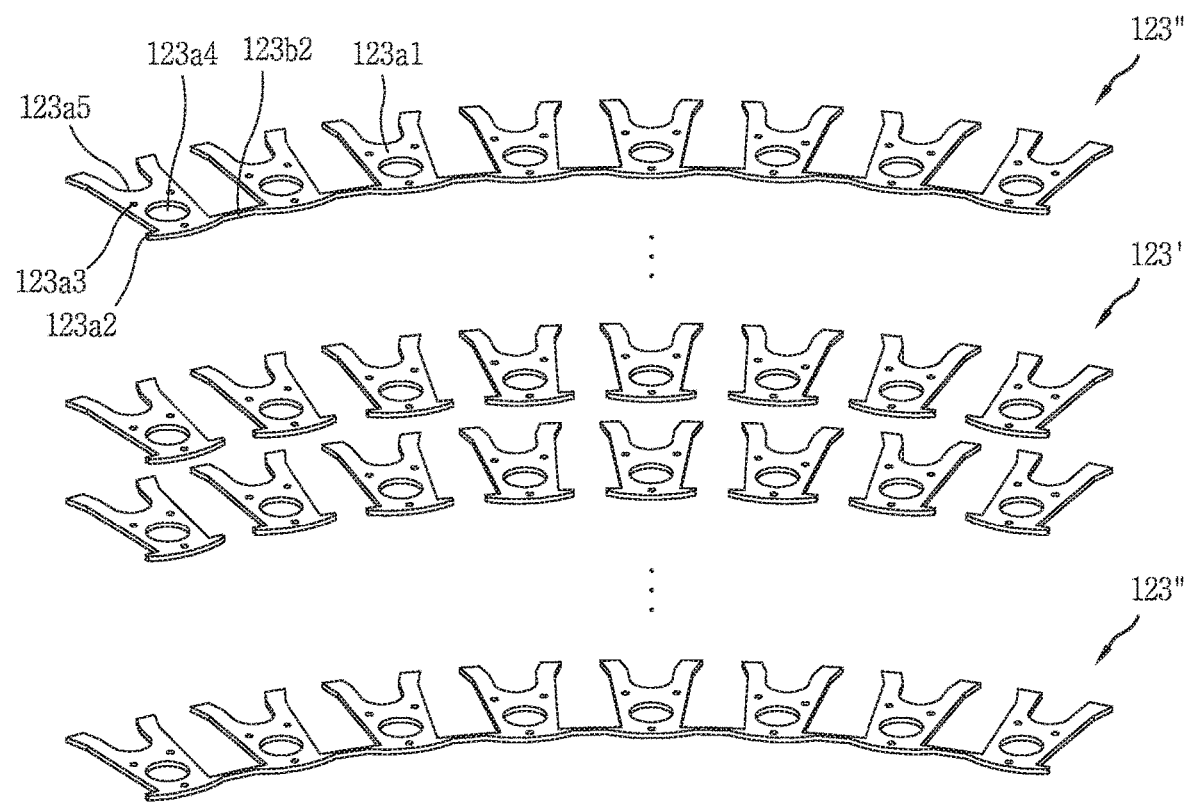
FIG. 6B is an exploded perspective view showing the example rotor core block of FIG. 6A.

FIG. 6B is an exploded perspective view showing the example rotor core block 123.

The rotor core block 123 is formed by stacking a plurality of electrical steel sheets 123', 123". The rotor core block 123 is provided with a plurality of rotor core segments 123a. Since the rotor core block 123 is formed by stacking a plurality of electrical steel sheets 123', 123", the rotor core segment 123a is also formed by stacking a plurality of electrical steel sheets 123', 123".

The plurality of rotor core segments 123a provided in one rotor core block 123 are arranged along a circumferential direction of the rotor 120. The plurality of rotor core segments 123a are partially spaced and partially connected along a circumferential direction of the rotor 120.

For a partial separation between the rotor core segments 123a, the rotor core block 123 includes first type electrical steel sheets 123'. In addition, for a partial connection between the rotor core segments 123a, the rotor core block 123 includes second type electrical steel sheets 123". The plurality of electrical steel sheets 123', 123" stacked to form the rotor core block 123 denote the first type electrical steel sheets 123' and the second type electrical steel sheets 123".

The first type electrical steel sheet 123' includes a body 123a1, a head 123a2, a core protrusion 123a3, a rotor core hole 123a4, a rotor core slot 123a5, and a mac 123a6. The second type electrical steel sheet 123" includes a body 123a1, a head 123a2, a core protrusion 123a3, a rotor core hole 123a4, a rotor core slot 123a5, a mac 123b6, and bridges 123b1, 123b2. However, only one body 123a1 is provided for each first type electrical steel sheet 123', while a plurality of bodies 123a1 are provided for the second type electrical steel sheet 123". Here, the plural number is equal to the number of rotor core segments 123a provided in the rotor core block 123. The plurality of bodies 123a1 provided in the second type electrical steel sheet 123" are connected to each other by the head 123a2 and the bridges 123b1, 123b2.

The body 123a1 of the first type electrical steel sheet 123' and the body 123a1 of the second type electrical steel sheet 123" are stacked on each other to form the body 123a1 of the rotor core segment 123a. The same applies to the head 123a2, the core protrusion 123a3, the rotor core hole 123a4, the rotor core slot 123a5, and the mac 123a6. Since the bridges 123b1, 123b2 are not provided in the first type electrical steel sheet 123', only the bridges 123b1, 123b2 of the second type electrical steel sheet 123" form the bridges 123b1, 123b2 of the rotor core block 123.

The body 123a1 of the first type electrical steel sheet 123' and the body 123a1 of the second type electrical steel sheet 123" form the body 123a1 of the rotor core segment 123a, and the plurality of bodies 123a1 formed as described above are spaced from each other along a circumferential direction of the rotor 120 to form a permanent magnet arrangement slot (MS) each therebetween.

If the rotor core segment 123a having a height of 39 mm is formed by the first type electrical steel sheet 123' and the second type electrical steel sheet 123" having a thickness of 0.5 mm in a direction parallel to an axial direction of the rotation shaft, a total of 78 sheets of the first type electrical steel sheets 123' and the second type electrical steel sheets 123" may be stacked.

The first type electrical steel sheets 123' and the second type electrical steel sheets 123" are distinguished from each other by their shapes. The bridges 123b1, 123b2 are not provided in the first type electrical steel sheet 123' while the bridges 123b1, 123b2 are provided in the second type electrical steel sheet 123". The bridges 123b1, 123b2 provided in the second type electrical steel sheet 123" refer to a configuration in which the plurality of rotor core segments 123a provided in one rotor core block 123 are connected to each other.

The first type electrical steel sheets 123' and the second type electrical steel sheets 123" are stacked along a direction parallel to an axial direction of the rotation shaft so as to form the rotor core segment 123a. A plurality of first type electrical steel sheets 123' are provided. A single or a plurality of second type electrical steel sheets 123" are provided.

The plurality first type electrical steel sheets 123' are stacked along a direction parallel to an axial direction of the rotation shaft so as to be in close contact with each other in the axial direction of the rotating shaft. On the contrary, the first type electrical steel sheets 123' are disposed apart from each other in a circumferential direction of the rotor 120. Accordingly, the first type electrical steel sheets 123' constituting one rotor core segment 123a are in close contact with each other, while the first type electrical steel sheets 123' constituting different rotor core segments 123a are spaced apart from each other. Since the rotor core segments 123a are spaced apart from each other in a circumferential direction of the rotor 120, the plurality of rotor core segments 123a may also be alternately arranged one by one with the plurality of permanent magnets.

The second type electrical steel sheets 123" are stacked together with the first type electrical steel sheets 123' to form a plurality of rotor core segments 123a. At least one second type electrical steel sheet 123" may be provided for each rotor core block 123, and a plurality of second type electrical steel sheets 123" may be provided. The second type electrical steel sheet 123" may be disposed on the first type electrical steel sheets 123', or may be stacked below and/or above the first type electrical steel sheets 123' on the basis of the stacking direction of the first type electrical steel sheets 123'.

As the second type electrical steel sheets 123" are provided with the bridges 123b1, 123b2, the plurality of rotor core segments 123a are not completely separated from each other in a circumferential direction of the rotor 120, but connected to each other through the bridges 123b1, 123b2 of the second type electrical steel sheets 123".

The bridges 123b1, 123b2 may be formed on at least one of an inner end and an outer end of the second type electrical steel sheet 123". Here, the inner end of the second type electrical steel sheet 123" refers to between the two heads 123a2, and the outer end thereof refers to between the two core protrusions 123a3. Since the second type electrical steel sheet 123" together with the first type electrical steel sheet 123' eventually constitute the rotor core block 123, an inner end of the second type electrical steel sheet 123" may be referred to as an inner end of the rotor core segment 123a, furthermore, an inner end of the rotor core block 123. The same applies to an outer edge thereof.

FIGS. 6A and 6B illustrate a configuration in which a bridge is formed on the head 123a2, which is an inner end of the second type electrical steel sheet 123", Furthermore, in FIGS. 6A and 6B, the second type electrical steel sheet 123" is stacked on the lower and upper ends of the plurality of first type electrical steel sheets 123'.

Accordingly, in a first implementation, the plurality of bridges 123b1, 123b2 are formed at an inner end of the plurality of rotor core segments 123a. Each of the bridges 123b1, 123b2 is protruded on both sides from an inner end of each rotor core segment 123a and connected to an inner end of another adjacent rotor core segment 123a.

Each of the plurality of bridges 123b1, 123b2 is formed to connect the first or second ends of two adjacent rotor core segments 123a located closer to each other among the plurality of rotor core segments 123a provided in the rotor core block 123. Here, the first and second ends is based on a direction parallel to an axial direction of the rotation shaft. For instance, the first ends of the rotor core segments 123a are lower ends of the rotor core segments 123a with respect to the axial direction, and the second ends of the rotor core segments 123a are upper ends of the rotor core segments 123a with respect to the axial direction.

In some implementations, the plurality of bridges 123b1, 123b2 may include a first bridge 123b1 and a second bridge 123b2. The first bridge 123b1 and the second bridge 123b2 may be disposed at positions spaced from each other in an axial direction of the rotation shaft. For instance, the first bridge 123b1 may connect the first ends (e.g., lower ends) of the plurality of rotor core segments 123a to each other, and the second bridge 123b2 may connect the second ends (e.g., upper ends) of the plurality of rotor core segments 123a to each other. However, the first bridge 123b1 and the second bridge 123b2 may not necessarily provided at each end. For example, the first bridge 123b1 and the second bridge 123b2 may be formed at a position spaced from each end in a direction parallel to an axial direction of the rotation shaft. In particular, at least one of the first bridge 123b1 or the second bridge 123b2 may be disposed at a position between the first end and the second end of the rotor core segment 123a. In some implementations, a third bridge, a fourth bridge, and the like, which have similar shapes as the first and second bridges 123b1 and 123b2, may be added at positions corresponding to any of the first end and the second end of the rotor core segment 123a. In some implementations, a third bridge, a fourth bridge, and the like may be added at positions between the first end and the second end of the rotor core segment 123a.

In some implementations, each of the bridges 123b1, 123b2 may not completely cover each permanent magnet 124 that is inserted between the two rotor core segments 123a, but may cover only a part(s) of the permanent magnet 124. For example, each of the bridges 123b1, 123b2 may cover only the first end and/or the second end of each permanent magnet 124, and may expose the remaining portion of the permanent magnet 124. This is because the first bridge 123b1 and the second bridge 123b2 are formed at positions spaced from each other in a direction parallel to an axial direction of the rotation shaft.

When the first bridge 123b1 and the second bridge 123b2 are spaced apart from each other, an opening is formed for each region defined by inner ends of the plurality of rotor core segments 123a, and the first bridge 123b1 and the second bridge 123b2. Furthermore, the plurality of permanent magnets 124 are exposed in a radial direction of the rotor 120 through the openings.

In some implementations, in view of the efficiency of a spoke type motor, the motor 100 may include the rotor core segments 123a that are completely split (separated) from each other. However, in some examples, the completely split structure of the rotor core segment 123a may cause a decrease in the structural strength of the rotor 120. If the bridges 123b1, 123b2 completely cover the permanent magnets 124, then the structural strength of the rotor 120 may be improved. However, the efficiency of the motor 100 may be rapidly reduced. As described above, the efficiency of the motor 100 and the structural strength of the rotor 120 may be in a trade-off relationship.

When the plurality of permanent magnets 124 are exposed through the openings, the bridges 123b1, 123b2 do not completely cover the permanent magnets 124, and thus the structural strength of the rotor 120 may be improved at some expense of the efficiency of the motor 100. In particular, the present disclosure is based on the premise that the effect of improving the structural strength of the rotor 120 is greater than the sacrificed efficiency of the motor 100.

The length and thickness of the bridges 123b1, 123b2 should be set in an appropriate range to reflect the trade-off relationship.

The thickness of either one of the bridges 123b1, 123b2 in a direction parallel to an axial direction of the rotation shaft may be 2 mm to 5 mm. If the thickness of the second type electrical steel sheet is 0.5 mm, then four to ten second type electrical steel sheets may be stacked. When the bridges 123b1, 123b2 are provided at lower and upper ends of the rotor core segment 123a in an arbitrary direction parallel to an axial direction of the rotation shaft, four to ten second type electrical steel sheets are stacked at the lower end, and four to ten second type electrical steel sheets are stacked at the upper end. The remaining thickness required to form the rotor core segment 123a is stacked by the first type electrical steel sheets.

When a sum of the thicknesses (a) of at least one bridge 123b1, 123b2 arranged in an arbitrary direction parallel to an axial direction of the rotation shaft is Σa, and a height of the rotor core segment 123a is b, it may be that a ratio (Σa/b) of the two values is 5% to 15%. When the bridge 123b includes the first bridge 123b1 and the second bridge 123b2, the sum (Σa) is equal to the sum of the thickness of the first bridge 123b1 and the thickness of the second bridge 123b2 in a direction parallel to an axial direction of the rotation shaft.

For instance, when the height of the rotor core segment 123a in a direction parallel to an axial direction of the rotation shaft is 33 mm, the thickness of the bridge 123b1 in a direction parallel to an axial direction of the rotation shaft is 1.65 mm to 4.95 mm. If the plurality of bridges 123b1, 123b2 are provided together in an arbitrary direction parallel to an axial direction of the rotation shaft and the height of the rotor core segment 123a is 33 mm in a direction parallel to the axial direction of the rotation shaft, then the sum of the thicknesses of the plurality of bridges 123b1, 123b2 is 1.65 mm to 4.95 mm.

If the ratio (a/b) is less than 5%, the effect of improving the structural strength is insufficient. In examples, where the ratio (a/b) exceeds 15%, the efficiency of the motor may be excessively reduced. When the bridges 123b1, 123b2 completely cover the permanent magnets 124, an electromotive force of the motor is reduced by about 20%, but the electromotive force of the motor is reduced only by about 5% in a numerical range of the ratio (a/b) of 5% to 15%. Therefore, there is an effect of improving the back electromotive force by about 15%.

The width of each of the bridges 123b1, 123b2 in a radial direction of the rotor 120 may be 0.45 mm to 2 mm. If the width of the bridges 123b1, 123b2 is less than 0.45 mm, the effect of improving the structural strength is insufficient. If the width of the bridges 123b1, 123b2 exceeds 2 mm, the efficiency of the motor is excessively reduced.

Figure 7A:
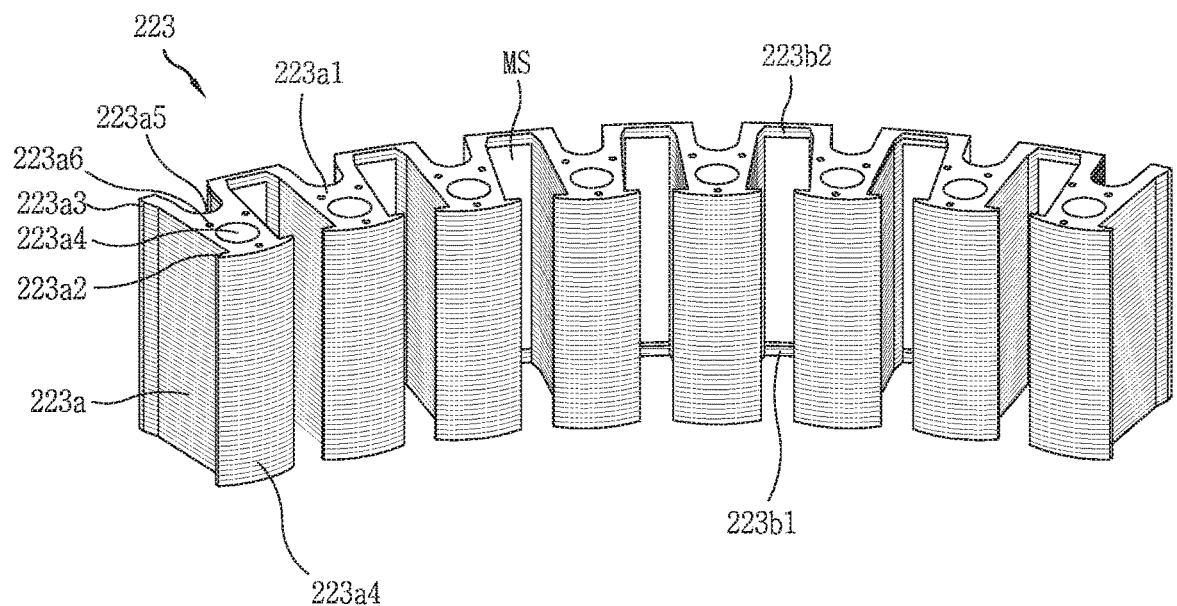
FIG. 7A is a perspective view showing an example rotor core block.

FIG. 7A is a perspective view showing an example rotor core block 223.

Figure 7B:
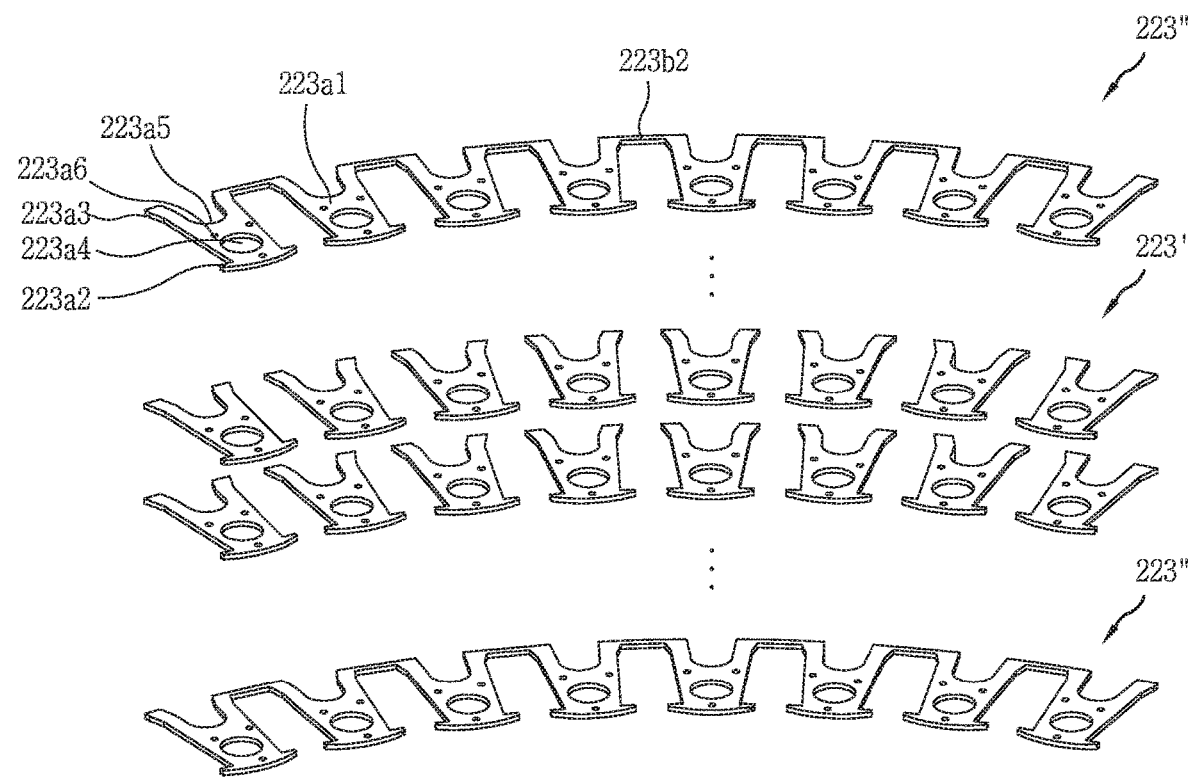
FIG. 7B is an exploded perspective view showing the example rotor core block of FIG. 7A.

FIG. 7B is an exploded perspective view showing the rotor core block 223.

The plurality of bridges 223b1, 223b2 may be formed at an outer end of the rotor core segment 223a. In this case, the plurality of bridges 223b1, 223b2 are formed so as to connect protrusions 223a3 formed on two adjacent second type electrical steel sheets 223".

The plurality of bridges 223b1, 223b2 may be formed between a first end and a second end of the rotor core segment 223a. This structure is more effective in restraining the permanent magnets 124 from being scattered in a radial direction during the high-speed operation of the motor.

In FIGS. 7A and 7B, the rotor core block 223 may include a first type electrical steel sheet 223', a body 223a1, a head 223a2, a rotor core hole 223a4, a rotor core slot 223a5, and a mac 223a6. Each of these components may have features similar to those of the rotor core block 123 described above.

Figure 8A:
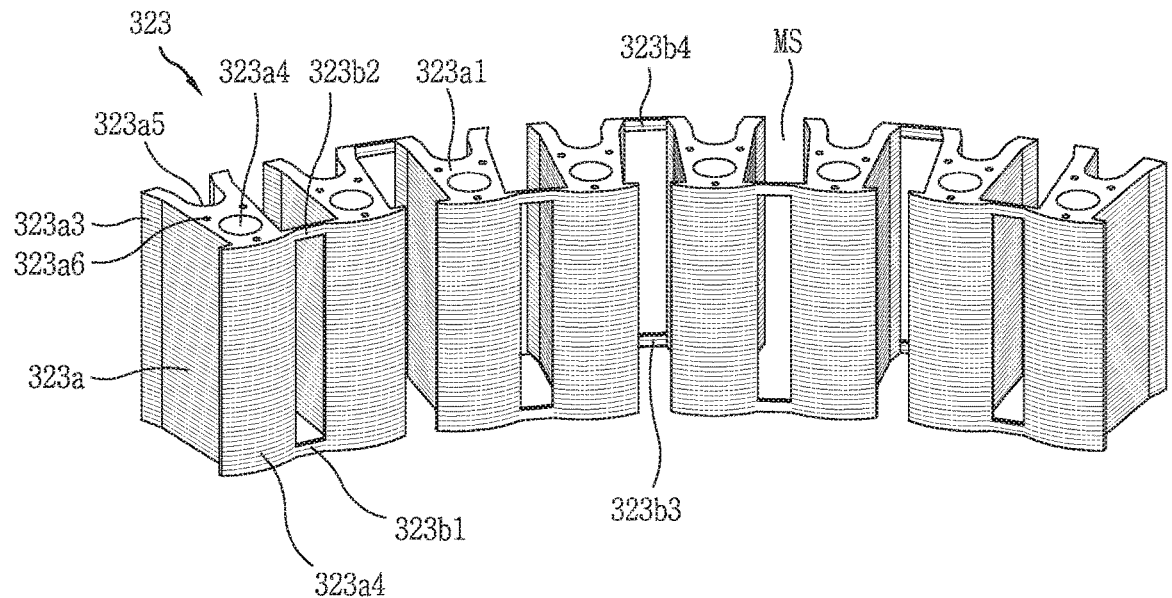
FIG. 8A is a perspective view showing an example rotor core block.

FIG. 8A is a perspective view showing an example rotor core block 323.

Figure 8B:
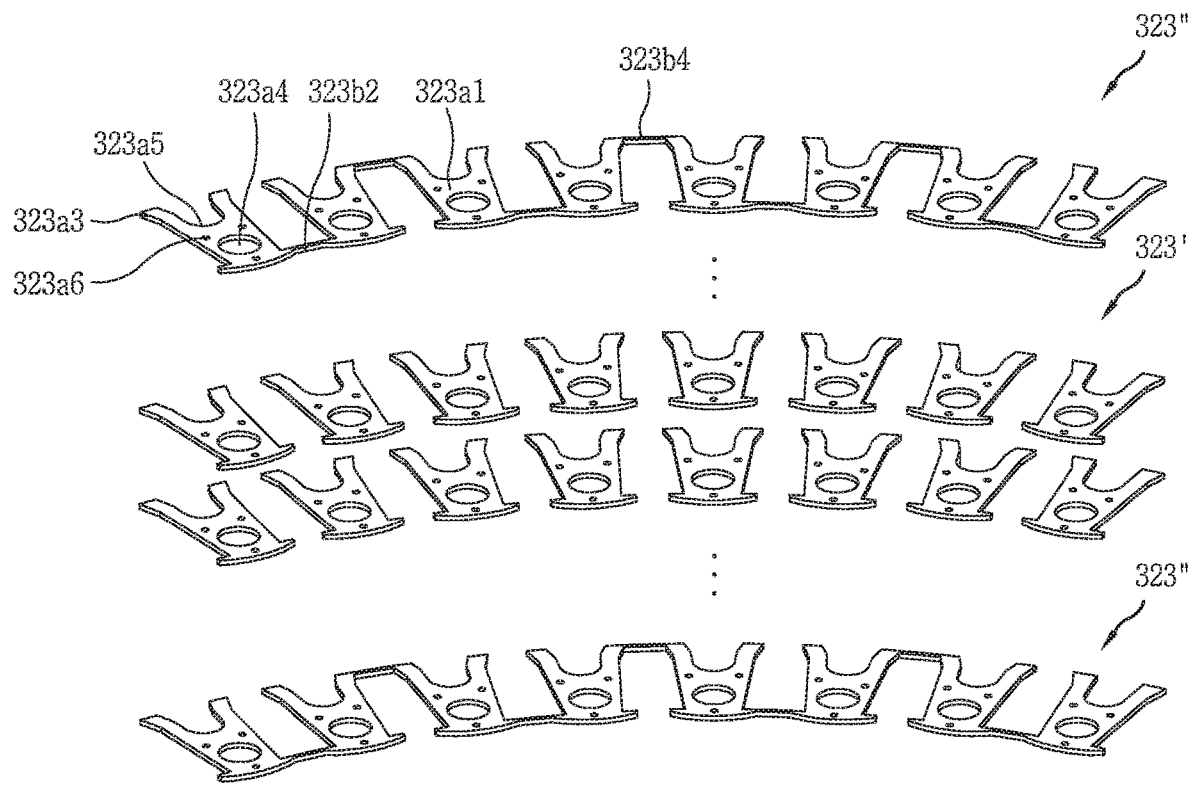
FIG. 8B is an exploded perspective view showing the example rotor core block of FIG. 8A.

FIG. 8B is an exploded perspective view showing the rotor core block 323.

The plurality of bridges 323b1, 323b2, 323b3, 323b4 may be alternately formed at an inner end and an outer end of the plurality of rotor core segments 323a. In this case, some (e.g., bridges 323b1, 323b2) of the plurality of bridges 323b1, 323b2, 323b3, 323b4 may connect the heads 323a2 disposed on two adjacent second type electrical steel sheets 323". Furthermore, the other bridges 323b3, 323b4 may connect the protrusions 323a3 disposed at the two adjacent second type electrical steel sheets 323". The outer end of the rotor core segment 323a is disposed radially outward of the inner end of the rotor core segment 323a.

Similarly, the plurality of bridges 323b1, 323b2, 323b3, 323b4 may be formed at the first and second ends of the rotor core segment 323a, respectively.

In FIGS. 8A and 8B, the rotor core block 323 includes a first type electrical steel sheet 323', a body 323a1, a rotor core hole 323a4, a rotor core slot 323a5, and a mac 323a6. Each of these components may have features similar to those of the rotor core block 123 or 223 described above.

Next, the assembly process of the rotor 200 will be described.

FIGS. 9A through 9E are conceptual views showing a procedure for manufacturing the rotor 200.

Figure 9A:
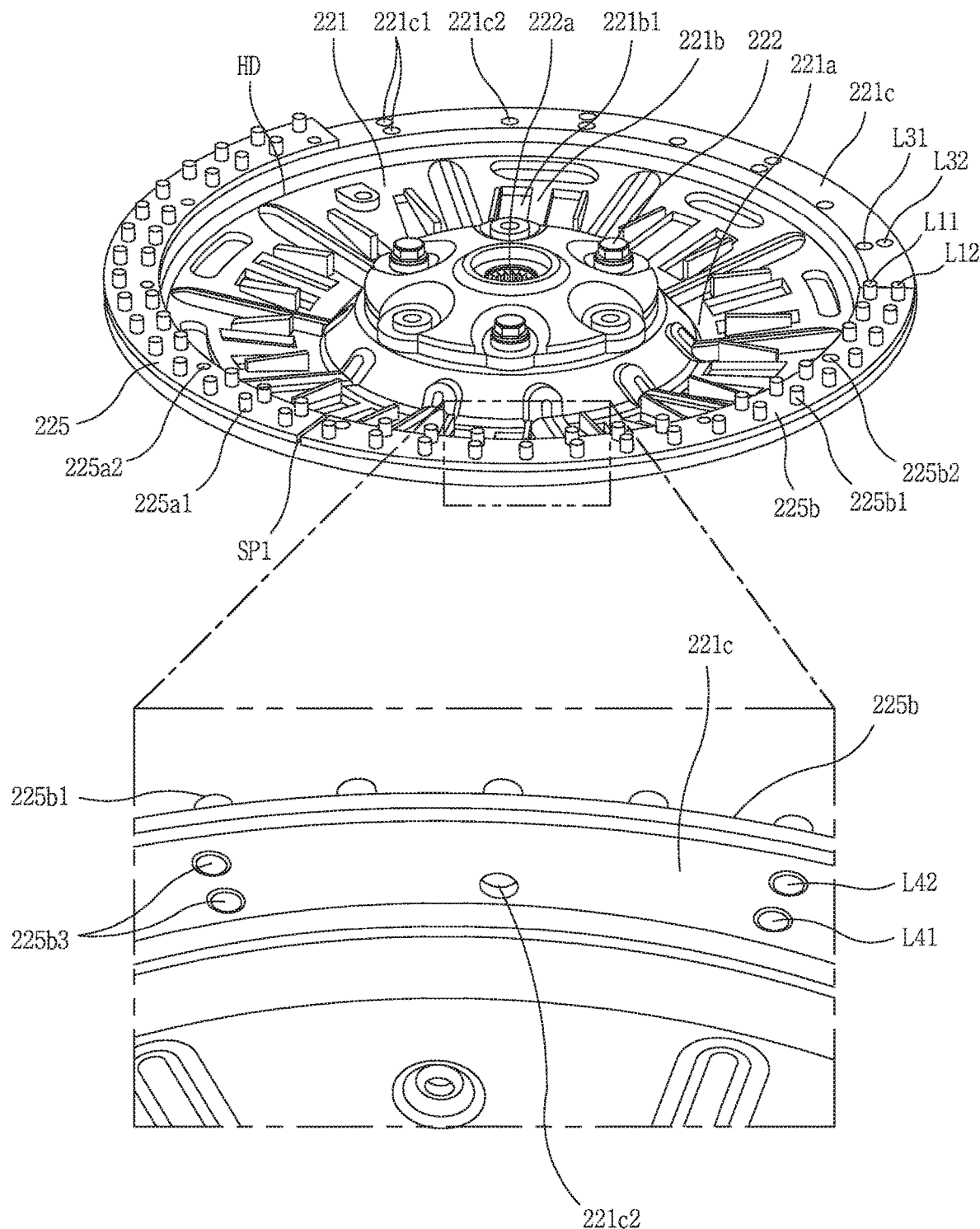
FIGS. 9A to 9E are conceptual views showing an example procedure for manufacturing the rotor.

First, referring to FIG. 9A, a bushing 222 is seated in a bushing coupling portion 221a. In addition, the bushing 222 is fastened to the bushing coupling portion 221a by a fastening member 222b. Reference numeral 222a corresponds to a thread.

Furthermore, the plates 225a, 225b constituting a first end cover 225 are seated on the base 221c of the rotor frame 221. The seating order of the bushing 222 and the first end cover 225 may be changed or may also be seated at the same time.

The position of the rotor frame coupling protrusion 225b3 formed on the first end cover 225 is adjusted to be inserted into the cover coupling hole 221c1 formed in the base 221c. The plurality of plates 225a and 225b forming the first end cover 225 along a circumference of the base 221c are seated on the base 221c.

Figure 9B:
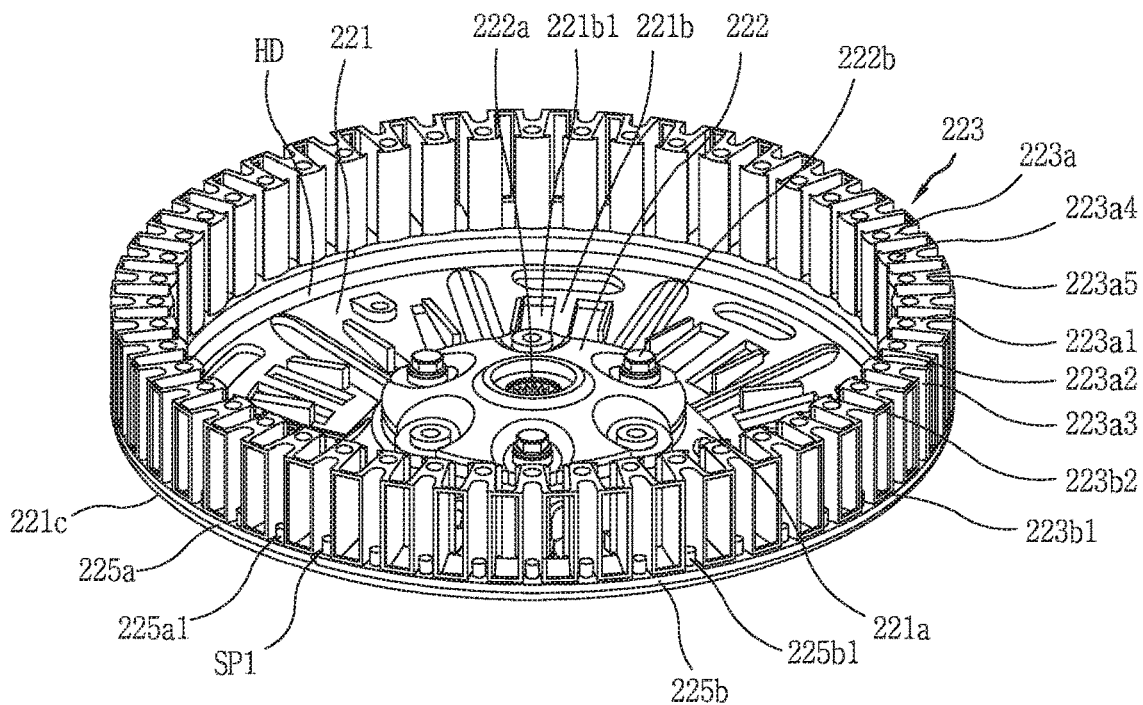

Next, referring to FIG. 9B, the rotor core block 223 is seated on the first end cover 225. The positions of the rotor core coupling protrusions 225a1, 225b1 formed on the first end cover 225 are adjusted to be inserted into the rotor core holes 223a4 and the rotor core slots 223a5 of the rotor core segment 223a.

One rotor core block 223 may have all the rotor core segments 223a of the rotor 220. In this case, all the rotor core segments 223a are connected by bridges 223b1, 223b2. Alternatively, the plurality of rotor core blocks 223 may be seated along a circumference of the first end cover 225.

Figure 9C:
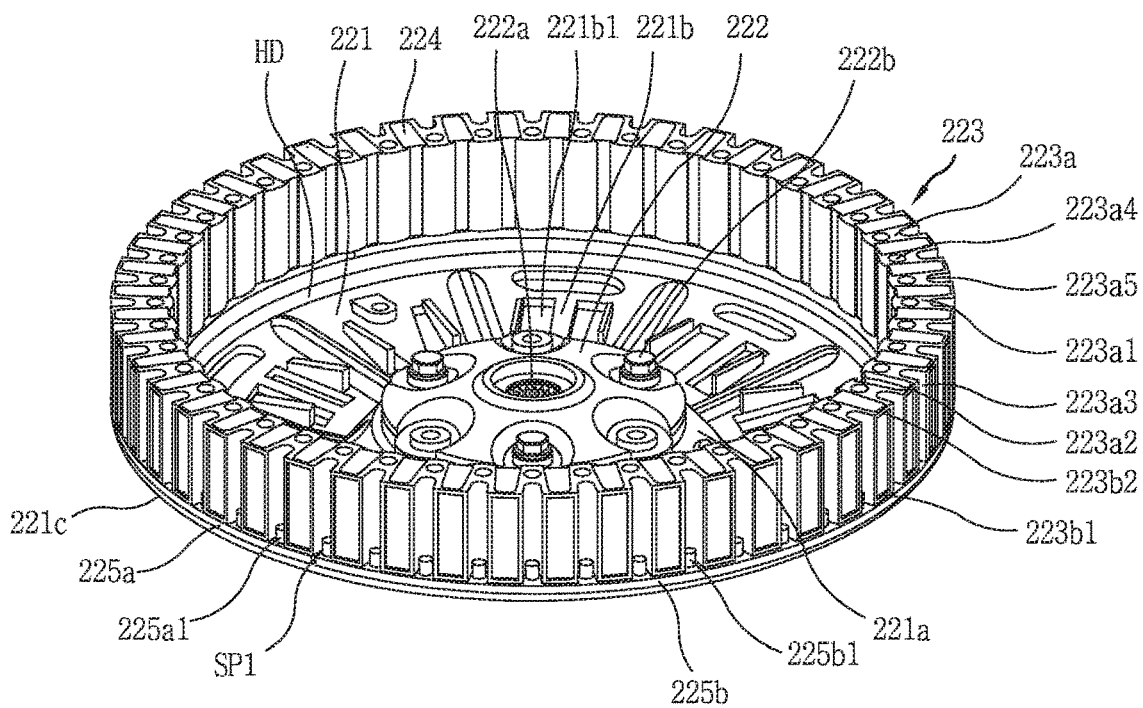

Next, referring to FIG. 9C, a permanent magnet 224 is inserted each between the two rotor core segments 223a.

The permanent magnet 224 is inserted in a direction parallel to an axial direction of the rotation shaft. The radial movement of the permanent magnet 224 is restricted by an inner end and an outer end of the rotor core segment 223a and the bridges 223b1, 223b2 formed at the inner end or the outer end of the rotor core segment 223a. The outer end of the rotor core segment 223a is disposed radially outward of the inner end of the rotor core segment 223a.

Figure 9D:
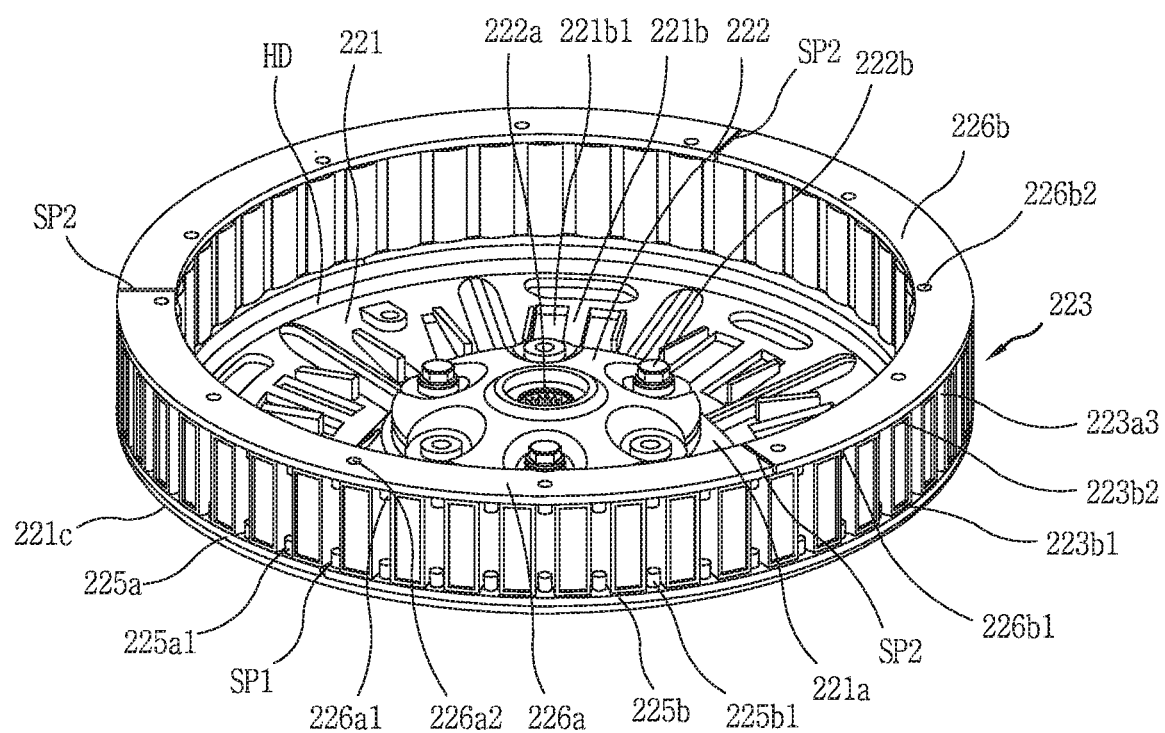

Next, referring to FIG. 9D, the plates 226a, 226b, 226c constituting the second end cover 226 are seated on the rotor core block 223 and the plurality of permanent magnets 224. The positions of the rotor core coupling protrusions 226a1 formed on the second end cover 226 are adjusted to be inserted into the rotor core holes 223a4 and the rotor core slots 223a5 of the rotor core segment 223a. The plurality of plates 226a, 226b, 226c forming the second end cover 226 are seated on the rotor core block 223 and the plurality of permanent magnets 224 along a circumference of the rotor 220.

Figure 9E:
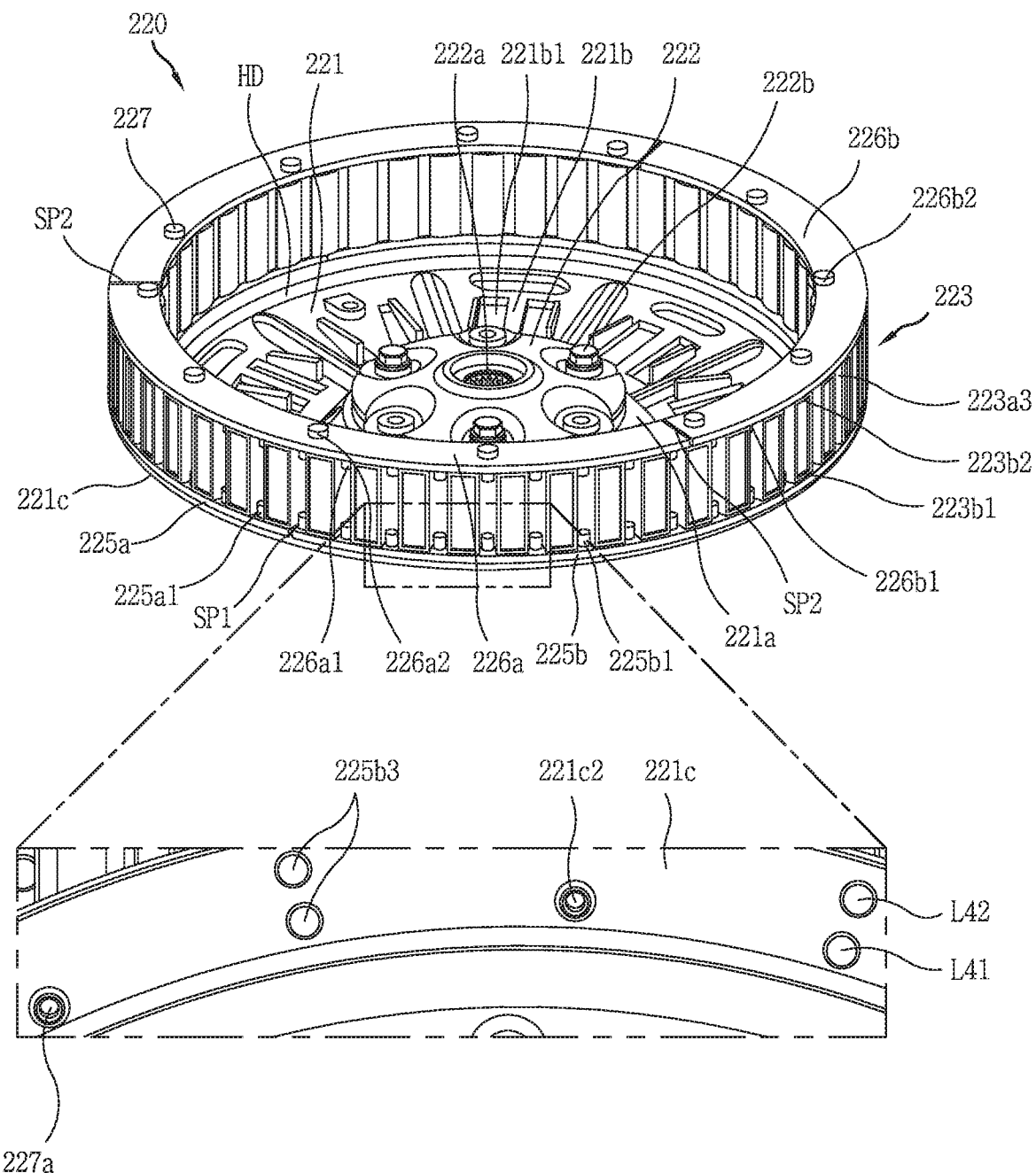

Finally, referring to FIG. 9E, the rivets 227 are used to couple parts constituting the rotor 220 to each other. The rotor 220 passes through rivet coupling holes 226a2, 226b2, 226c2 of the second end cover 226, a rotor core hole 223a4 of the rotor core segment 223a, rivet coupling holes 225a2, 225b2 of the first end cover 225, and a rivet coupling hole 221c2 of the base 221c along a direction parallel to an axial direction of the rotation shaft. A first end of the rivet 227 is exposed to the rivet coupling hole 221c2 formed in the base 221c of the rotor frame 221. When the first end of the rivet 227 is machined to have an outer diameter larger than the rivet coupling hole 221c2 of the base 221c, the engagement of the rivet 227 is completed to complete the assembly of the rotor 220.

The rotor formed by assembling parts constituting the rotor has been described above. Hereinafter, the rotor formed by insert injection molding will be described.

Figure 10:
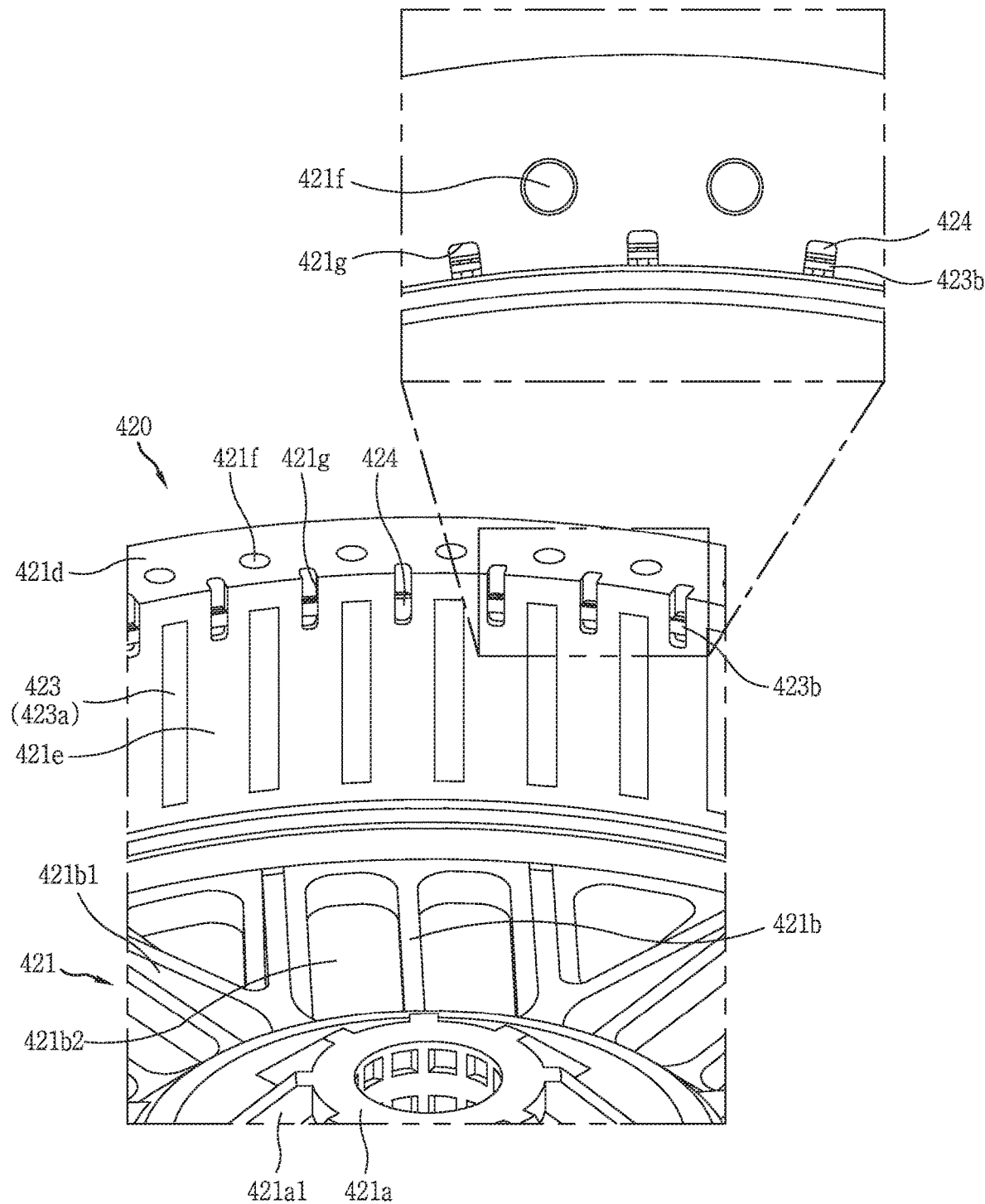
FIG. 10 is a view showing an example rotor.

FIG. 10 is a concept showing another implementation of the rotor 400.

Injection molding is a type of method of molding a resin, and refers to a method of cooling and solidifying a molten raw material in a mold at a high pressure to produce a molded article having a shape corresponding to the mold. A molded article produced by injection molding is referred to as an injection product.

Insert injection molding refers to a method of injecting an insert component together with a molten raw material into a mold to produce a molded article. The injection product has a shape corresponding to a mold, and is produced while an insert component is integrated with an injection product inside the injection product.

At least one rotor core block 423 and a permanent magnet 424 are disposed along a circumferential direction in the mold prior to insert injection molding. The rotor core block 423 has a plurality of rotor core segments 423a. Accordingly, a plurality of rotor core segments 423a and a plurality of permanent magnets 424 are alternately arranged at predetermined positions of the mold along a predetermined circumference.

In this state, when a molten injection material is injected into the mold and insert injection molding is performed, the molten injection material forms a rotor frame 421. The rotor frame 421 of the rotor 420 thus manufactured integrates at least one rotor core block 423 and a plurality of permanent magnets 424.

A portion surrounding the rotor core block 423 and the plurality of permanent magnets 424 in the rotor frame 421 may be referred to as a circumferential wall or a circumferential wall 421d. The circumferential wall 421d surrounds first and second ends of the rotor core block 423 in a direction parallel to an axial direction of the rotation shaft, and surrounds first and second ends of the plurality of permanent magnets 424. Furthermore, the circumferential wall 421d surrounds an outer end of the rotor core block 423 and an outer end of the plurality of permanent magnets 424 in a radial direction of the rotor 420.

An inner pillar 421e is formed at an inner end of the circumferential wall 421d. The inner pillar 421e is extended along a direction parallel to an axial direction of the rotation shaft. A plurality of inner pillars 421e are provided, and the plurality of inner pillars 421e are formed at positions spaced from each other along an inner end of the circumferential wall 421d.

The inner pillar 421e is formed in the same direction as the permanent magnet 424 in a radial direction of the rotor frame 421, and disposed closer to the rotation shaft than the permanent magnet 424. An opening may be formed each between the two inner pillars 421e, and an inner end of the rotor core segment 423a exposed through the opening. The permanent magnet 424 may be covered by the inner end of the rotor core segment 423a and the inner pillar 421e.

If the rotor 420 is manufactured by insert injection molding, the first end cover and the second end cover as described above are not required. This is because the circumferential wall 421d of the rotor frame 421 serves as a first end cover and a second end cover. In some implementations, a rotor frame hole 421f and a permanent magnet fixing jig hole 421g may be formed to fix parts in the mold during insert injection molding.

The rotor frame hole 421f is a position where the mold pin has been disposed during insert injection molding for producing the rotor 420 originally. Even though the molten raw material for insert injection molding is filled in the mold, the molten material is only filled above or below the mold pin, and the molten material cannot exist at the position where the mold pin exists. Therefore, as a result of insert injection molding, the rotor frame hole 421f remains.

The permanent magnet fixing jig hole 421g is formed at one end of the inner pillar 421e. The permanent magnet fixing jig holes 421g are formed at positions corresponding to the respective permanent magnets 424 in a radial direction of the rotor frame 421.

A permanent magnet fixing jig for fixing the plurality of permanent magnets 424 may be formed on a mold for producing the rotor 420. The permanent magnet fixing jig closely adheres each of the permanent magnets 424 seated on a mold pin the mold pin along a direction parallel to an axial direction of the rotation shaft. Therefore, each of the permanent magnets 424 may be fixed along this direction.

Even though the molten raw material for insert injection molding is filled in the mold, the molten raw material cannot exist at the position where the permanent magnet fixing jig exists. Therefore, as a result of insert injection molding, the permanent magnet fixing jig hole 421g remains. The position of the permanent magnet 424 may be visually checked from an outer side of the rotor frame 421 through the permanent magnet fixing jig hole 421g since the permanent magnet 424 is visually exposed through the permanent magnet fixing jig hole 421g.

Furthermore, the bridge 423b is exposed through the permanent magnet fixing jig hole 421g. The bridge 423b connects the two rotor core segments 423a across an inner end or an outer end of the permanent magnet 424 and thus may be exposed through the permanent magnet fixing jig hole 421g.

According to the injection molding, there is advantages that a complicated assembly process is not required, and respective parts constituting the rotor 420 are integrated to improve the structural strength of the rotor 420.

In FIG. 10, non-described reference numerals 421a, 421a1, 421b, 421b1 and 421b2 denote a bushing coupling portion, a first reinforcing rib, a spoke, a second reinforcing rib, and a heat dissipation hole, respectively. The first reinforcing rib and the second reinforcing rib are respectively protruded from a circumference of the bushing coupling portion and the spoke, thereby improving the structural strength. The description of the remaining configuration is replaced with the above description.

The configurations and methods according to the above-described implementations will not be limited to the foregoing motor, and all or part of each implementation may be selectively combined and configured to make various modifications thereto.

In some implementations, a partially split structure of a rotor core using a bridge may be adopted by breaking away from a completely divided structure of the rotor core, thereby dramatically improving the structural strength of the rotor at some expensed of the efficiency of the motor. The partially split structure of the rotor core may reduce the number of parts for manufacturing the rotor compared to the completely split structure, thereby improving the productivity of the motor.

In some implementations, the first end cover and the second end cover may be configured with a plurality of plates to disperse a centrifugal force applied to the rotor to each plate. In addition, the plates of the first end cover and the plates of the second end cover may be arranged to be staggered from each other in a direction parallel to an axial direction of the rotation shaft, thereby improving the structural strength of the rotor.

In some implementations, the first end cover, the second end cover, the rotor core, and the coupling structure of various protrusions and holes, protrusion and grooves formed in the rotor fame may be used, thereby guiding each part to be located in place as well as maintaining a strong coupling force of the manufactured rotor during the assembly of the rotor.

In some implementations, the rotor may include plates of the same shape constituting the first end cover, plates of the same shape constituting the second end cover, rotor core blocks of the same shape, and the like, thereby securing dimensional stability subsequent to the assembly process of the rotor as well as reducing a performance variation during the mass production of the motor.

What is claimed is:
1. A motor, comprising:
a stator; and
a rotor rotatably disposed at an inner side of the stator, wherein the rotor comprises:
 a rotor core block comprising a plurality of rotor core segments arranged along a circumferential direction of the rotor, each of the rotor core segments comprising a plurality of electrical steel sheets that are stacked on one another, and
 a plurality of permanent magnets disposed between the plurality of rotor core segments, wherein the plurality of rotor core segments and the plurality of permanent magnets are alternately arranged along the circumferential direction of the rotor, wherein the plurality of electrical steel sheets comprise bridges that connect the plurality of rotor core segments to one another along the circumferential direction of the rotor, wherein the plurality of electrical steel sheets comprise:
first type electrical steel sheets that are stacked along an axial direction of the rotor, that are in contact with one another in the axial direction of the rotor, and that are spaced apart from one another in the circumferential direction of the rotor, each of the first type electrical steel sheets having a first shape, and
second type electrical steel sheets that are connected to the bridges and that are disposed at least one of above the first type electrical steel sheets or below the first type electrical steel sheets, each of the second type electrical steel sheets having a second shape different from the first shape, wherein the first type electrical steel sheets are stacked between the second type electrical steel sheets in the axial direction of the rotor, and wherein each of the plurality of rotor cores comprises the first type electrical steel sheets and at least one of the second type electrical steel sheets that is disposed at a lower end of the first type electrical steel sheets or an upper end of the first type electrical steel sheets, and wherein each of the first type electrical steel sheets and each of the second type electrical steel sheets comprise:
a body that faces an working surface of the plurality of permanent magnets in the circumferential direction of the rotor,
a head that protrudes from an inner end of the body to both sides along the circumferential direction of the rotor, and
core protrusions that protrude radially outward from an outer end of the body and that are spaced apart from each other in the circumferential direction of the rotor to thereby define a rotor core slot between the core protrusions, and wherein each of the bridges connects the heads of two adjacent second type electrical steel sheets to each other or connects the core protrusions of the two adjacent second type electrical steel sheets to each other, one of the plurality of permanent magnets being interposed between the two adjacent second type electrical steel sheets.

2. The motor of claim 1, wherein the bridges are disposed at at least one of an inner end of the second type electrical steel sheets or an outer end of the second type electrical steel sheets, the inner end being radially inward of the outer end.

3. The motor of claim 1, wherein the bridges include inner bridges disposed at an inner end of the second type electrical steel sheets and outer bridges disposed at an outer end of the second type electrical steel sheets, the inner end being radially inward of the outer end, and
wherein the inner bridges and the outer bridges are alternately arranged along the circumferential direction of the rotor.

4. The motor of claim 1, wherein one or more of the second type electrical steel sheets are disposed at each of the upper end and the lower end of the first type electrical steel sheets with respect to the axial direction of the rotor.

5. The motor of claim 1, wherein the bridges and two adjacent rotor core segments of the plurality of rotor core segments define an opening that exposes one of the plurality of permanent magnets in a radial direction of the rotor.

6. The motor of claim 1, further comprising a rotation shaft that passes through the stator and that is connected to the rotor,
wherein each of the plurality of rotor core segments has a height in an axial direction of the rotation shaft, and
wherein a ratio of a sum of thicknesses of one or more of the bridges in the axial direction of the rotation shaft with respect to the height is 5% to 15%.

7. The motor of claim 1, wherein a width of each of the bridges in a radial direction of the rotor is 0.45 mm to 2 mm.

8. The motor of claim 1, further comprising a rotation shaft that passes through the stator and that is connected to the rotor,
wherein a thickness of each of the bridges in an axial direction of the rotation shaft is 2 mm to 5 mm.

9. The motor of claim 1, further comprising a rotation shaft that passes through the stator and that is connected to the rotor,
wherein each of the plurality of rotor core segments has a first end and a second end positioned opposite to each other in an axial direction of the rotation shaft,
wherein each of the plurality of permanent magnets has a first end and a second end positioned opposite to each other in the axial direction of the rotation shaft, and
wherein the rotor further comprises:
a first end cover that covers the first ends of the plurality of permanent magnets and the first ends of the plurality of rotor core segments in the axial direction of the rotation shaft;
a second end cover that is spaced apart from the first end cover in the axial direction of the rotation shaft and that covers the second ends of the plurality of permanent magnets and the second ends of the plurality of rotor core segments in the axial direction of the rotation shaft; and
a rotor frame connected to the rotation shaft and configured to support the first end cover or the second end cover in the axial direction of the rotation shaft.

10. The motor of claim 9, wherein each of the first end cover and the second end cover has an annular shape along the circumferential direction of the rotor.

11. The motor of claim 10, wherein the first end cover comprises a plurality of first plates that are arranged along the circumferential direction of the rotor, each of the plurality of first plates having an annular sector shape or a circular arc shape, and
wherein the second end cover comprises a plurality of second plates that are arranged along the circumferential direction of the rotor, each of the plurality of second plates having an annular sector shape or a circular arc shape.

12. The motor of claim 11, wherein the plurality of first plates and the plurality of second plates are arranged to be offset from each other in the circumferential direction of the rotor.

13. The motor of claim 11, wherein the plurality of first plates face each other at first split points that are arranged along the circumferential direction of the rotor,
wherein the plurality of second plates face each other at second split points that are arranged along the circumferential direction of the rotor, and
wherein the first split points and the second split points are alternately arranged in the circumferential direction of the rotor.

14. The motor of claim 11, wherein each of the plurality of rotor core segments defines a rotor core hole or the rotor core slot that extends parallel to the axial direction of the rotation shaft, and
    wherein each of the plurality of first plates and each of the plurality of second plates comprise a rotor core coupling protrusion configured to be inserted into the rotor core hole or the rotor core slot.

15. The motor of claim 9, wherein one of the first end cover or the second end cover comprises a rotor frame coupling protrusion that protrudes toward the rotor frame,
    wherein the rotor further comprises a bushing connected to the rotation shaft, and
    wherein the rotor frame comprises:
        a bushing coupling portion configured to receive the bushing;
        a plurality of spokes that extend along a radial direction and that are disposed around the bushing coupling portion; and
        a base that is disposed at an outer circumference of the plurality of spokes, that extends along the circumferential direction of the rotor, and that is configured to support the first end cover or the second end cover, the base defining a cover coupling hole configured to receive the rotor frame coupling protrusion.

16. The motor of claim 15, wherein each of the plurality of rotor core segments defines a rotor core hole that extends parallel to the axial direction of the rotation shaft,
    wherein each of the first end cover, the second end cover, and the base defines a rivet coupling hole at a position facing the rotor core hole in the axial direction of the rotation shaft, and
    wherein the rotor further comprises a rivet that passes through the rotor core hole, the rivet coupling hole of the first end cover, the rivet coupling hole of the second end cover, and the rivet coupling hole of the base.

17. The motor of claim 16, wherein the cover coupling hole and the rivet coupling hole are alternately arranged at the base along the circumferential direction of the rotor.

18. The motor of claim 15, wherein the bushing coupling portion comprises a thread that protrudes toward the rotation shaft and that extends in the axial direction of the rotation shaft.

19. A motor, comprising:
a stator;
a rotor rotatably disposed at an inner side of the stator or an outer side of the stator; and
a rotation shaft that passes through the stator and that is connected to the rotor,
wherein the rotor comprises:
    a rotor core block comprising a plurality of rotor core segments arranged along a circumferential direction of the rotor, each of the rotor core segments comprising a plurality of electrical steel sheets that are stacked on one another, and
    a plurality of permanent magnets disposed between the plurality of rotor core segments, wherein the plurality of rotor core segments and the plurality of permanent magnets are alternately arranged along the circumferential direction of the rotor,
wherein the plurality of electrical steel sheets comprise bridges that connect the plurality of rotor core segments to one another along the circumferential direction of the rotor,
wherein each of the plurality of rotor core segments has a first end and a second end positioned opposite to each other in an axial direction of the rotation shaft,
wherein each of the plurality of permanent magnets has a first end and a second end positioned opposite to each other in the axial direction of the rotation shaft, and
wherein the rotor further comprises:
    a first end cover that covers the first ends of the plurality of permanent magnets and the first ends of the plurality of rotor core segments in the axial direction of the rotation shaft,
    a second end cover that is spaced apart from the first end cover in the axial direction of the rotation shaft and that covers the second ends of the plurality of permanent magnets and the second ends of the plurality of rotor core segments in the axial direction of the rotation shaft, and
    a rotor frame connected to the rotation shaft and configured to support the first end cover or the second end cover in the axial direction of the rotation shaft.

* * * * *